United States Patent
Tang et al.

(10) Patent No.: US 11,828,900 B2
(45) Date of Patent: Nov. 28, 2023

(54) ELASTIC ADAPTIVE DOWNHOLE ACQUISITION SYSTEM

(71) Applicant: Schlumberger Technology Corporation, Sugar Land, TX (US)

(72) Inventors: Yiqiao Tang, Cambridge, MA (US); Yi-Qiao Song, Newton Center, MA (US); Martin Hurlimann, Newton, MA (US); Yanxian Lin, Goleta, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 23 days.

(21) Appl. No.: 17/279,617

(22) PCT Filed: Sep. 27, 2019

(86) PCT No.: PCT/US2019/053552
§ 371 (c)(1),
(2) Date: Mar. 25, 2021

(87) PCT Pub. No.: WO2020/069378
PCT Pub. Date: Apr. 2, 2020

(65) Prior Publication Data
US 2022/0035065 A1 Feb. 3, 2022

Related U.S. Application Data

(60) Provisional application No. 62/738,318, filed on Sep. 28, 2018.

(51) Int. Cl.
*G01V 3/32* (2006.01)
*E21B 47/13* (2012.01)
(Continued)

(52) U.S. Cl.
CPC ............... *G01V 3/32* (2013.01); *E21B 47/13* (2020.05); *E21B 49/08* (2013.01); *G01V 3/38* (2013.01); *G06N 5/01* (2023.01); *E21B 2200/22* (2020.05)

(58) Field of Classification Search
None
See application file for complete search history.

(56) References Cited

U.S. PATENT DOCUMENTS 5,309,098 A * 5/1994 Coates ................. G01N 24/081
324/306
5,486,762 A 1/1996 Freedman et al.
(Continued)

FOREIGN PATENT DOCUMENTS

CN 203308456 U 11/2013
CN 107169463 A 9/2017
(Continued)

OTHER PUBLICATIONS

Office Action issued in U.S. Appl. No. 17/044,587 dated Mar. 17, 2022, 11 pages.
(Continued)

*Primary Examiner* — Lina Cordero
(74) *Attorney, Agent, or Firm* — Jeffrey D. Frantz

(57) ABSTRACT

A method can include performing an operation using a system where the operation depends on a decision made via a digital decision model stored in memory of the system; responsive to a decision state of the digital decision model, transmitting a request to update the digital decision model; and responsive to the request, receiving an updated digital decision model, where the updated digital decision model includes at least one new decision state that improves performance of the operation of the system.

18 Claims, 26 Drawing Sheets

(51) Int. Cl.
*E21B 49/08* (2006.01)
*G06N 5/01* (2023.01)
*G01V 3/38* (2006.01)

(56) References Cited

U.S. PATENT DOCUMENTS

| | | | |
|---|---|---|---|
| 6,291,995 B1 | 9/2001 | Speier et al. | |
| 6,766,254 B1 | 7/2004 | Bradford et al. | |
| 7,301,338 B2* | 11/2007 | Gillen | G01R 33/3808 324/303 |
| 7,565,833 B2* | 7/2009 | Gillen | E21B 49/087 324/303 |
| 7,660,705 B1* | 2/2010 | Meek | G06F 18/295 703/2 |
| 10,042,026 B2 | 8/2018 | Li et al. | |
| 2003/0214286 A1 | 11/2003 | Heidler | |
| 2004/0267770 A1 | 12/2004 | Lee | |
| 2005/0257610 A1* | 11/2005 | Gillen | E21B 49/087 324/303 |
| 2006/0033491 A1 | 2/2006 | Blanz et al. | |
| 2008/0021654 A1* | 1/2008 | Gillen | E21B 49/087 702/11 |
| 2008/0257546 A1 | 10/2008 | Cresswell et al. | |
| 2008/0270346 A1 | 10/2008 | Mehta et al. | |
| 2010/0259415 A1 | 10/2010 | Strachan et al. | |
| 2011/0174541 A1 | 7/2011 | Strachan et al. | |
| 2011/0295510 A1 | 12/2011 | Gulati | |
| 2012/0316787 A1 | 12/2012 | Moran et al. | |
| 2013/0214779 A1 | 8/2013 | Tietjen et al. | |
| 2013/0226461 A1 | 8/2013 | Yu et al. | |
| 2013/0325408 A1 | 12/2013 | Song | |
| 2014/0190747 A1 | 7/2014 | Hay | |
| 2014/0251688 A1 | 9/2014 | Turner et al. | |
| 2014/0253116 A1 | 9/2014 | Freedman et al. | |
| 2016/0047935 A1 | 2/2016 | Ali et al. | |
| 2016/0170067 A1 | 6/2016 | Heaton | |
| 2016/0170071 A1 | 6/2016 | Yang et al. | |
| 2016/0202384 A1 | 7/2016 | Utsuzawa et al. | |
| 2017/0004455 A1* | 1/2017 | Tang | G06N 20/00 |
| 2017/0032210 A1 | 2/2017 | Deppieri et al. | |
| 2017/0235007 A1 | 8/2017 | Holtz | |
| 2017/0308634 A1 | 10/2017 | Samuel et al. | |
| 2017/0315258 A1 | 11/2017 | Molina et al. | |
| 2017/0335662 A1 | 11/2017 | Torrado et al. | |
| 2018/0188403 A1 | 7/2018 | Halsey et al. | |
| 2019/0138920 A1* | 5/2019 | Lin | G06F 16/9027 |
| 2019/0249523 A1 | 8/2019 | Moghanloo et al. | |
| 2019/0331813 A1 | 10/2019 | Zhang et al. | |
| 2019/0360320 A1 | 11/2019 | Hohl | |
| 2020/0019882 A1 | 1/2020 | Garg et al. | |
| 2020/0185085 A1 | 6/2020 | Mavrieudus et al. | |
| 2020/0319369 A1 | 10/2020 | Shao et al. | |
| 2020/0392836 A1 | 12/2020 | Mohnke et al. | |
| 2021/0157026 A1 | 5/2021 | Yang et al. | |

FOREIGN PATENT DOCUMENTS

| | | |
|---|---|---|
| CN | 107590775 A | 1/2018 |
| EP | 3038049 A1 | 6/2016 |
| WO | 0125823 A1 | 4/2001 |
| WO | 201062635 A3 | 6/2010 |
| WO | 2017127045 A1 | 7/2017 |
| WO | 2018030994 A1 | 2/2018 |
| WO | 2019222300 A1 | 11/2019 |

OTHER PUBLICATIONS

Office Action issued in U.S. Appl. No. 17/044,587 dated Nov. 1, 2022, 12 pages.
International Search Report and Written Opinion issued in International Patent application PCT/US2019/032337 dated Aug. 23, 2019, 12 pages.
International Preliminary Report on Patentability of International Patent Application No. PCT/US2019/032337 dated Nov. 17, 2020, 7 pages.
International Search Report and Written Opinion issued in International Patent application PCT/US2019/053552 dated Jan. 16, 2020, 10 pages.
Atkinson et al. "Optimum experimental designs for properties of a compartmental model." Biometrics, Jun. 1993, 325-337.
Bahrami, A., et al. "Robust, Integrated Computational Control of NMR Experiments to Achieve Optimal Assignment by ADAPT-NMR." Plos One, 2012, 7(3), 7 pages.
Box et al., "Design of experiments in non-linear situations." Biometrika 46.1/2 (1959): 77-90.
Burges, C. J.. "A Tutorial on Support Vector Machines for Pattern Recognition," Data Mining and Knowledge Discovery, 2, 1998, pp. 121-167.
Chaloner, K. et al., "Bayesian Experimental Design: A Review", Statistical Science, 1995, 10(3), pp. 273-304.
Duan, C., et al. "Effect of off-resonance on T1 saturation recovery measurement in inhomogeneous fields." Journal of Magnetic Resonance 2017, 281, pp. 31-43.
Eghbalnia et al., "High-resolution iterative frequency identification for NMR as a general strategy for multidimensional data collection." Journal of the American Chemical Society 127.36 (2005): 12528-12536.
"Golub, G. H. et al., "Singular Value Decomposition and Least Squares Solutions" Numer. Math, 1970, 14, pp. 403-420.".
Hansen et al., "Absolute Minimal Sampling in High-Dimensional NMR Spectroscopy." Angewandte Chemie International Edition 55.45 (2016): 14169-14172.
Hansen et al., "Absolute Minimal Sampling of Homonuclear 2D NMR TOSCY Spectra for High-Throughput Applications of Complex Mixtures." Angewandte Chemie(2017) 56, 8149-8152.
Heaton, et al. "Next Generation LWD NMR for Slim Holes." SPWLA 59th Annual Logging Symposium. Society of Petrophysicists and Well-Log Analysts, 2018, 12 pages.
Hiller, S., et al. "Automated projection spectroscopy (APSY)." Proceedings of the National Academy of Sciences of the United States of America, 2005, 102(31), pp. 10876-10881.
Hurlimann et al., "Spin Dynamics of Carr-Purcell-Meiboom-Gill-like Sequences in Grossly Inhomogenous B0 and B1 Fields and Application to NMR Well Logging" Journal of Magnetic Resoanance, 2000, 143, pp. 120-135.
Jaravine et al., "Targeted acquisition for real-time NMR spectroscopy." Journal of the American Chemical Society 128.41 (2006): 13421-13426.
Ma et al. "Magnetic resonance fingerprinting." Nature 495.7440 (2013): 187-193.
Mcgivney et al., "SVD compression for magnetic resonance fingerprinting in the time domain." IEEE transactions on medical imaging 33.12 (2014): 2311-2322.
Shi et al, Edge computing: Vision and challenges, IEEE Internet of Things Journal 3 (5) (2016), pp. 637-646.
Song., et al. "Real-time optimization of nuclear magnetic resonance experiments." Journal of Magnetic Resonance 289 (2018): 72-78.).
Venkataramanan, L. et al., "Solving Fredholm integrals of the First Kind with Tensor Product Structure in 2 and 2.5 Dimensions", IEEE Transactions on Signal Processing, 2002, 50(5), pp. 1017-1026.
Wald, Abraham. Sequential analysis.Chapter 2 Sequential Test of a Statistical Hypothesis: General Discussion, Courier Corporation, 1973, 31 pages.
Yi-Qiao et al. "Two-dimensional NMR of Diffusion and Relaxation." Diffusion NMR of Confined Systems. 2016. 111-155.
Zhao et al., "Accelerated MR Parameter Mapping with Low-Rank and Sparsity Constraints", Magnetic Resonance in Medicine, 2015, 74(2), pp. 489-498.
Tang, Y. et al., "Elastic Regression—Tree Learning in a Heterogeneous Computing Environment", IEEE Internet of Things Journal, 2019, 6(5), 9 pages.
Huan, X. et al., "Sequential Bayesian optimal experimental design via approximate dynamic programming", ARXIV.org, Cornell University Library, 2016, 34 pages.
Extended Search Report issued in European Patent Application No. 19866591.1 dated May 13, 2022, 10 pages.

(56) References Cited

OTHER PUBLICATIONS

First Office Action issued in Chinese Patent Application No. 2019800710162 dated Jan. 28, 2023, 25 pages with English translation.
Yan et al., Study on real-time control and analysis system for LWD, includes English Abstract and English References, Oil Drilling & Production Technology, vol. 23, No. 3, China, May 2010, 5 pages.
Second Office Action issued in Chinese Patent Application No. 2019800710162 dated Jul. 29, 2023, 15 pages.
Ding, S. et al., "Survey on Multi Class Twin Support Vector Machines", Journal of Software, 2018, 29(1), 20 pages includes English abstract.
Office Action issued in U.S. Appl. No. 17/044,587 dated Apr. 27, 2023, 14 pages.

* cited by examiner

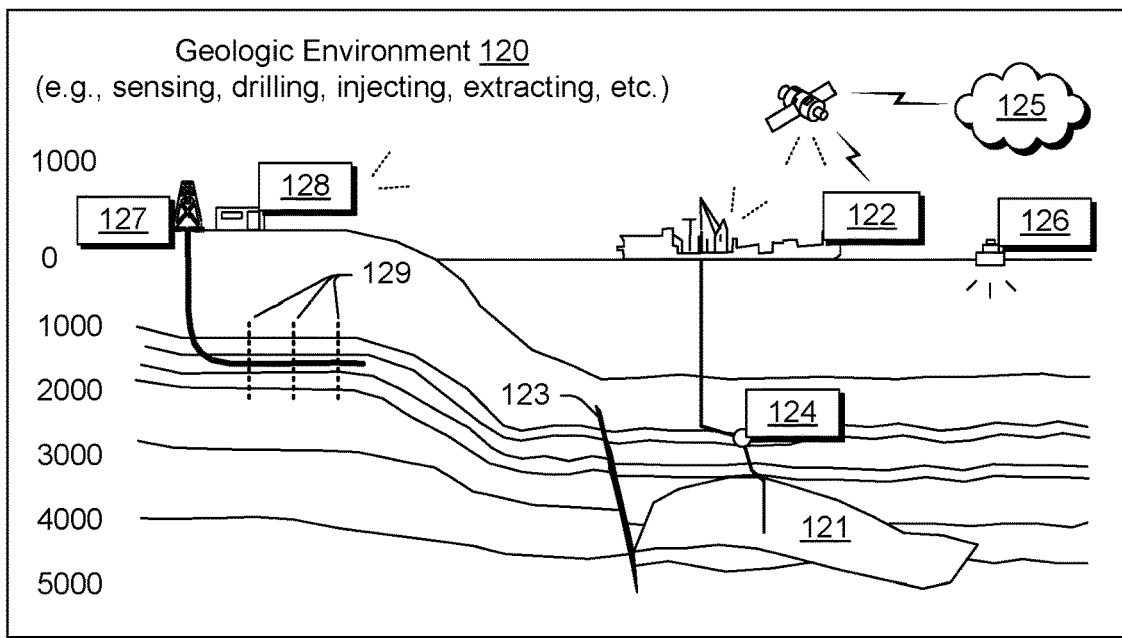
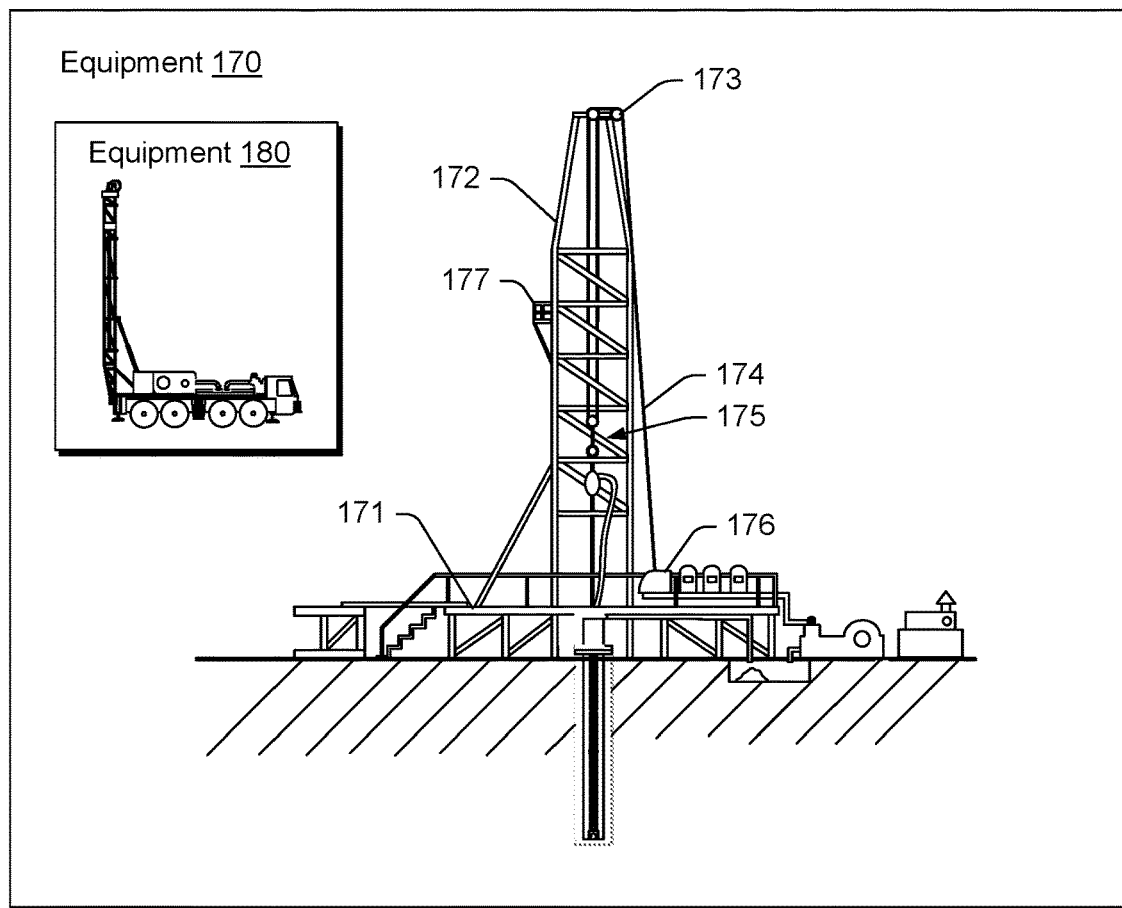
Fig. 1

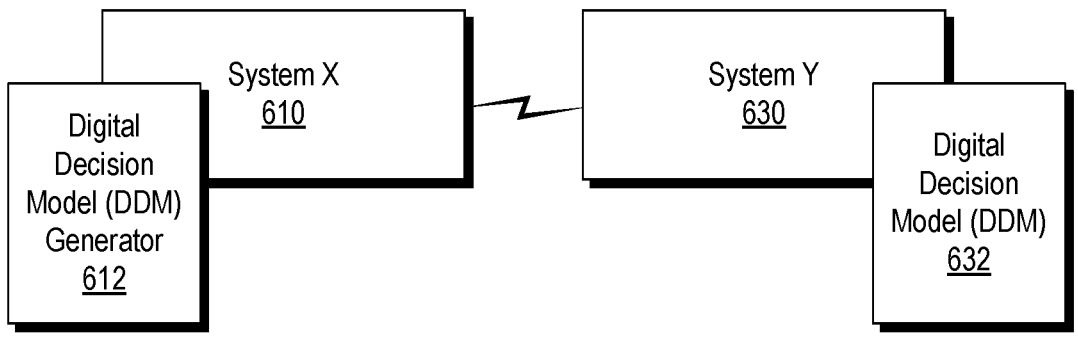
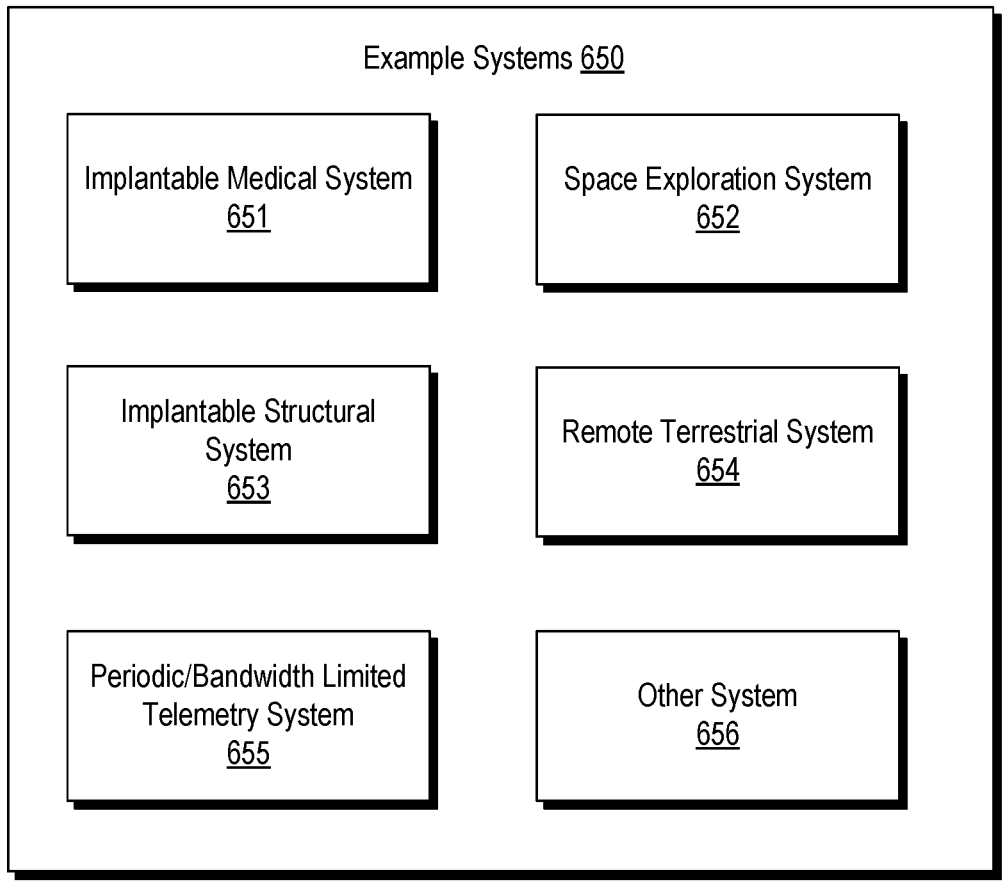
Fig. 6

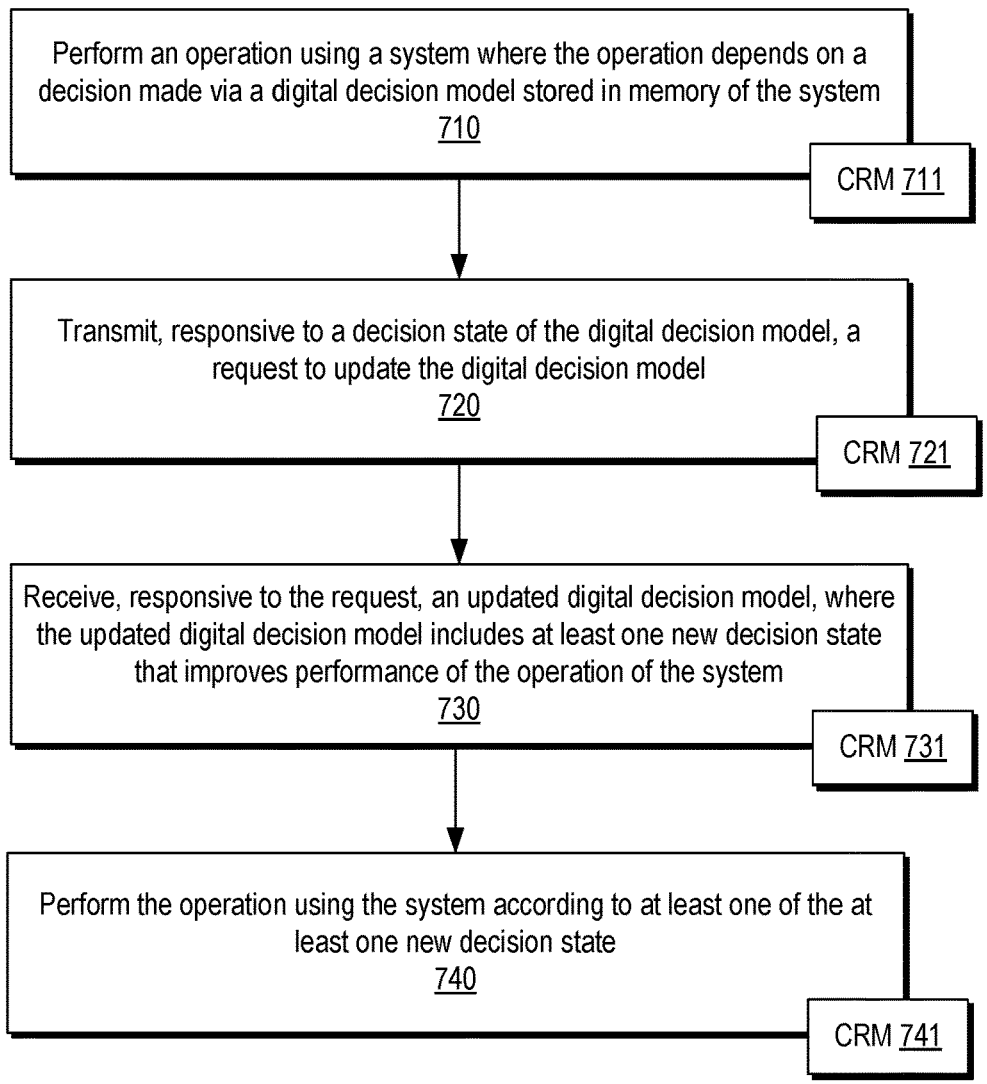
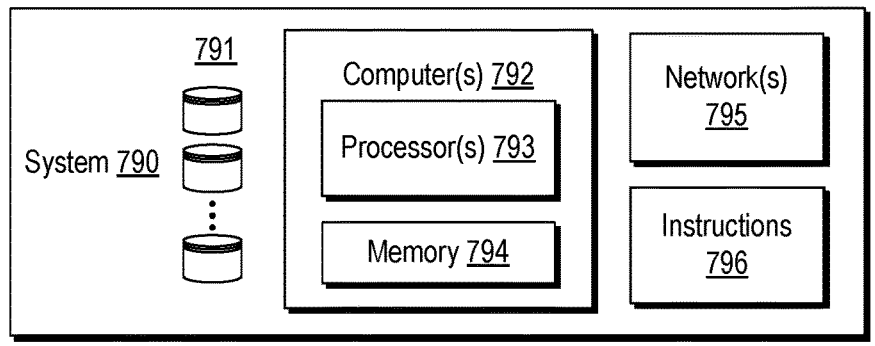
Fig. 7

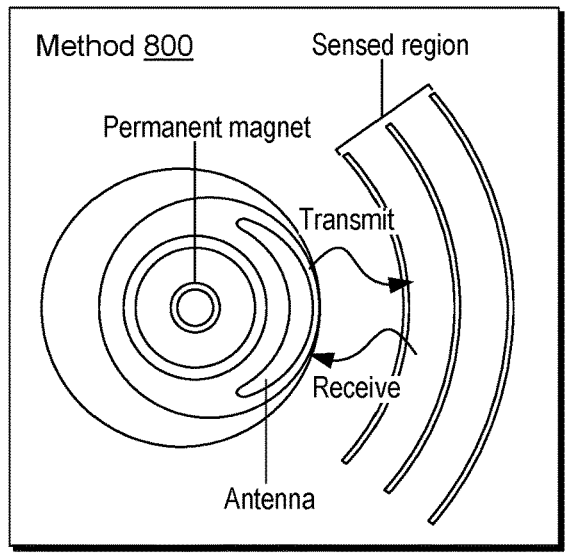
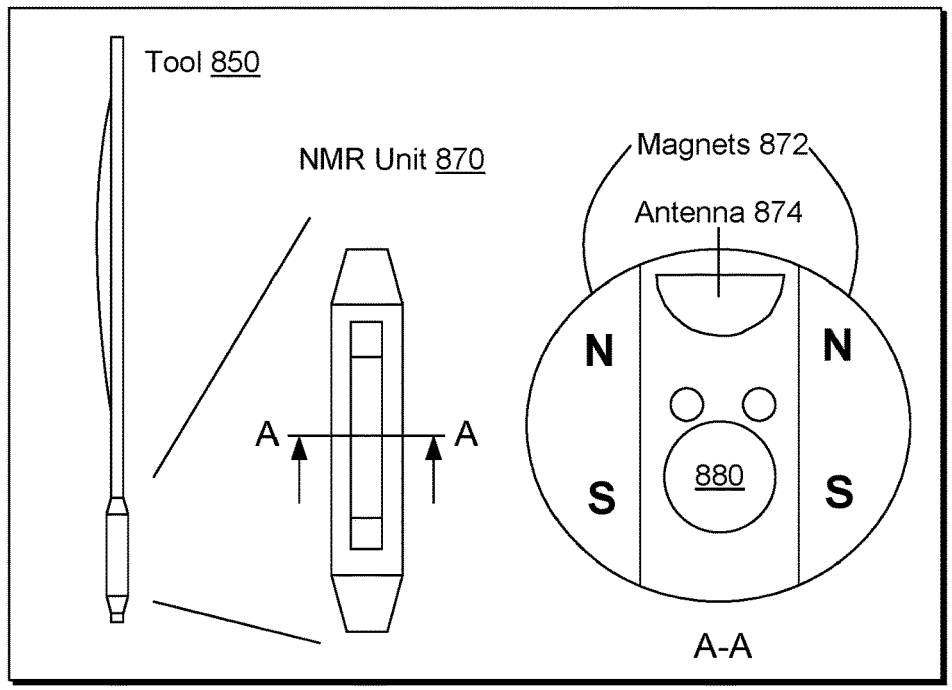
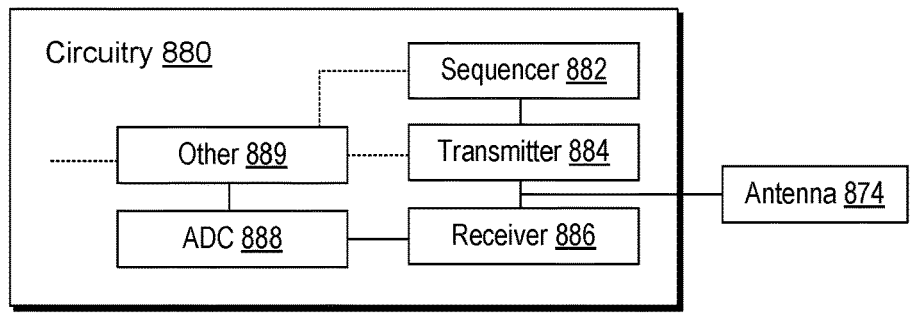
Fig. 8

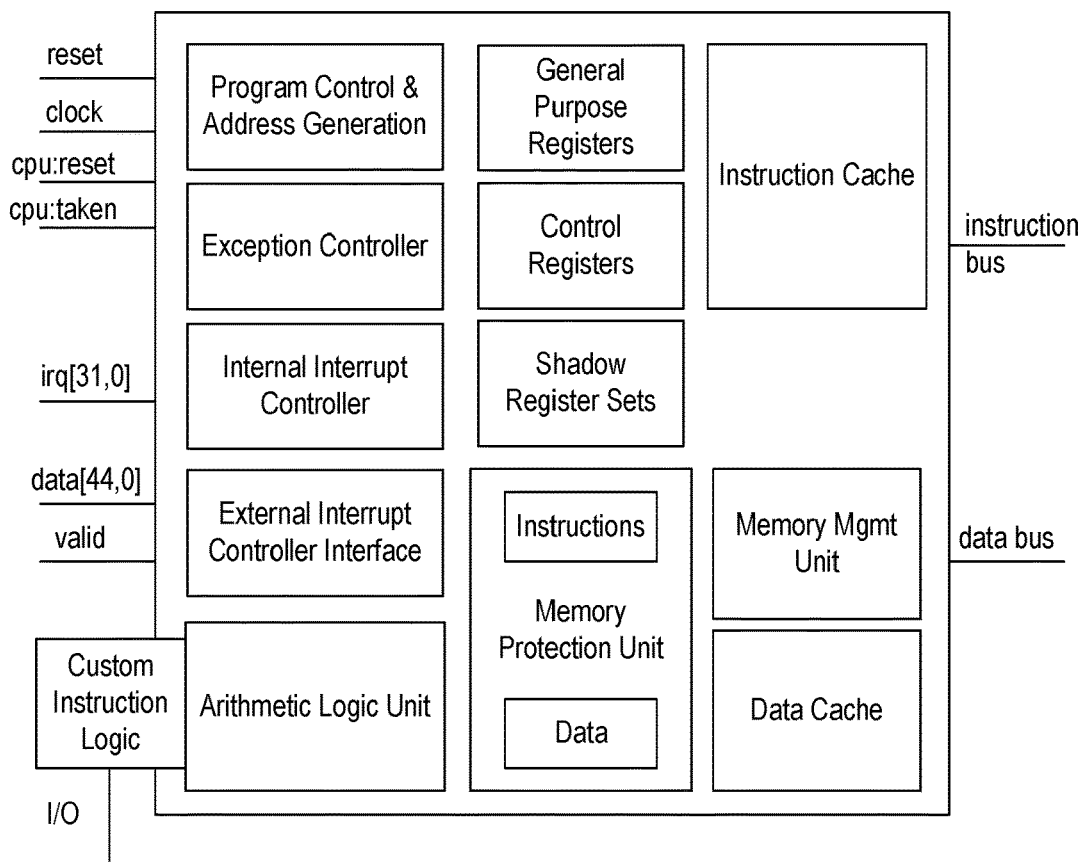
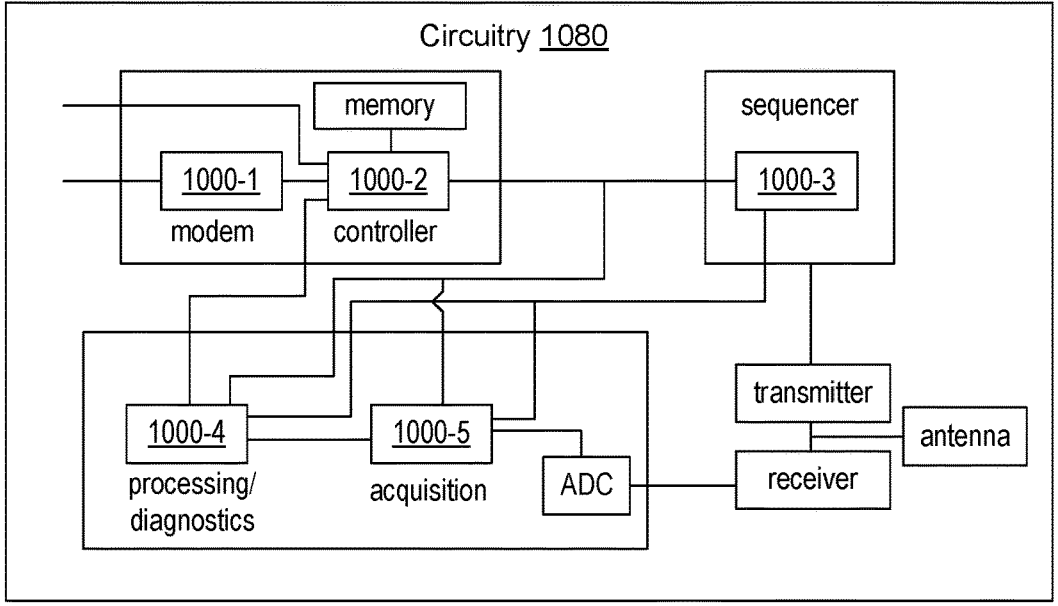
Fig. 10

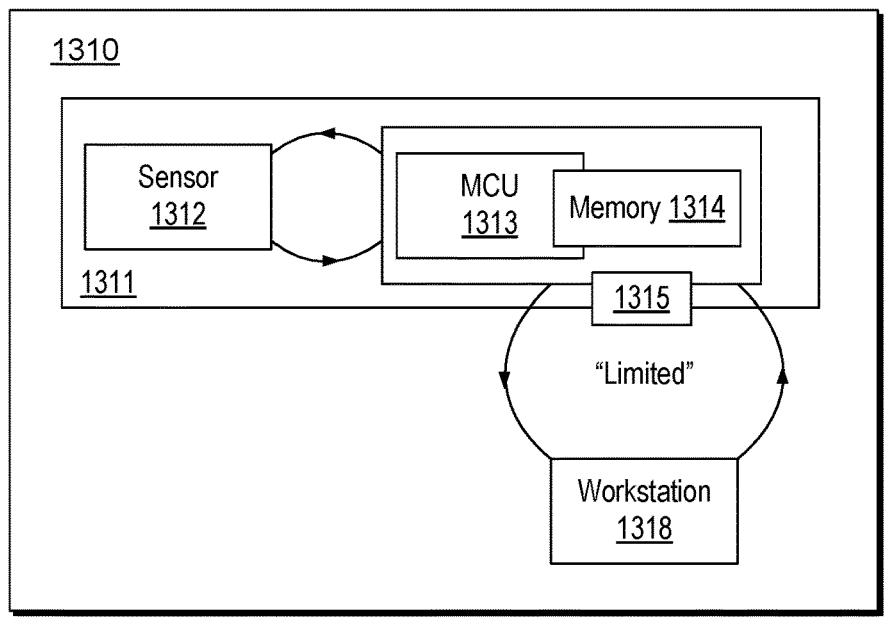
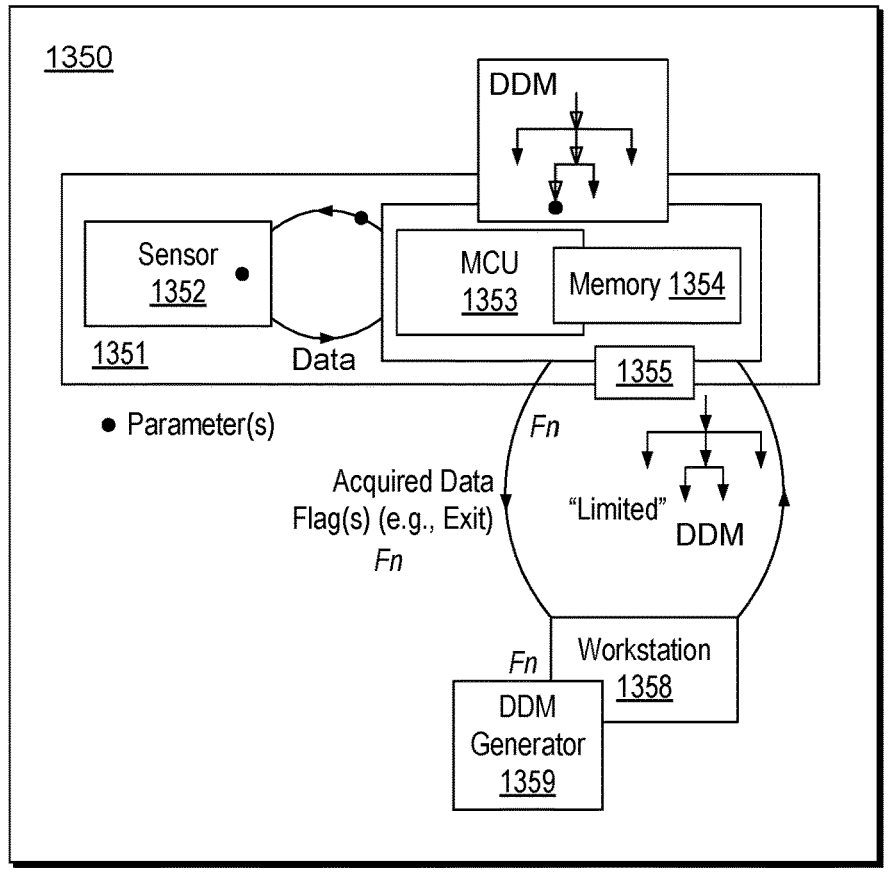
Fig. 13

1400

2410

Convex Hull Sampling
    Input: data $acceptedQSet$, $rejectedQSet_j$
    $acceptedCH$ = convex hull of $acceptedQSet$
    $qCandidate = \tilde{q}$ in $acceptedCH$
    if $rejectedQSet_j$ is empty then
        return $qCandidate$
    end if
    for each $rejectedQSet_j$ do
        $rejectedCH_j$ = convex hull of $rejectedQSet_j$
        for $\tilde{q}$ in $qCandidate$ do
            if $\tilde{q} \notin L, \tilde{q} \in rejectedCH_j$ then
                $qCandidate = qCandidate - \tilde{q}$
            end if
        end for
    end for

2430

Expand $acceptedQset$
    Input: data $acceptedQSet$, dimension $nDim$
    for $i = 1$ to $nDim$ do
        $qList = q_i$'s of $acceptedQSet$ in ascending order
        for $k = 1$ to length of $qList$ do
            $dList_k = qList_{k+1} - qList_k$
        end for
        $radius_i = min(dList)$
    end for
    $shift = max(radius)$
    $qSet_1 = acceptedQSet - shift \times 0.025$
    $qSet_2 = acceptedQSet + shift \times 0.025$
    return $acceptedQSet \cap qSet_1 \cap qSet_2$

Fig. 24

ELASTIC ADAPTIVE DOWNHOLE ACQUISITION SYSTEM

RELATED APPLICATIONS

This application claims priority to and the benefit of a U.S. Provisional Application having Ser. No. 62/738,318 filed 28 Sep. 2018, which is incorporated by reference herein.

BACKGROUND

Various types of operations can be performed using a system that includes memory and telemetry circuitry where the memory may be limited and/or where the telemetry may be limited.

SUMMARY

A method can include performing an operation using a system where the operation depends on a decision made via a digital decision model stored in memory of the system; responsive to a decision state of the digital decision model, transmitting a request to update the digital decision model; and responsive to the request, receiving an updated digital decision model, where the updated digital decision model includes at least one new decision state that improves performance of the operation of the system. A system can include a processor; memory accessible to the processor; processor-executable instructions stored in the memory and executable by the processor to instruct the system to: perform an operation using the system where the operation depends on a decision made via a digital decision model stored in the memory of the system; responsive to a decision state of the digital decision model, transmit a request to update the digital decision model; and, responsive to the request, receive an updated digital decision model, where the updated digital decision model includes at least one new decision state that improves performance of the operation of the system. One or more computer-readable storage media can include processor-executable instructions executable to instruct a processor to: call for performance of an operation using a system where the operation depends on a decision made via a digital decision model stored in memory of the system; responsive to a decision state of the digital decision model, call for transmission of a request to update the digital decision model; and, responsive to the request, call for storage in the memory of a received updated digital decision model, where the updated digital decision model includes at least one new decision state that improves performance of the operation of the system. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 6 illustrates examples of systems;

FIG. 7 illustrates an example of a method and an example of a system;

FIG. 8 illustrates an example of a method and an example of a tool;

FIG. 10 illustrates an example of a microprocessor and an example of circuitry;

FIG. 13 illustrates examples of systems;

FIG. 24 illustrates an examples of pseudocode for examples of methods;

DETAILED DESCRIPTION

Figure 2:
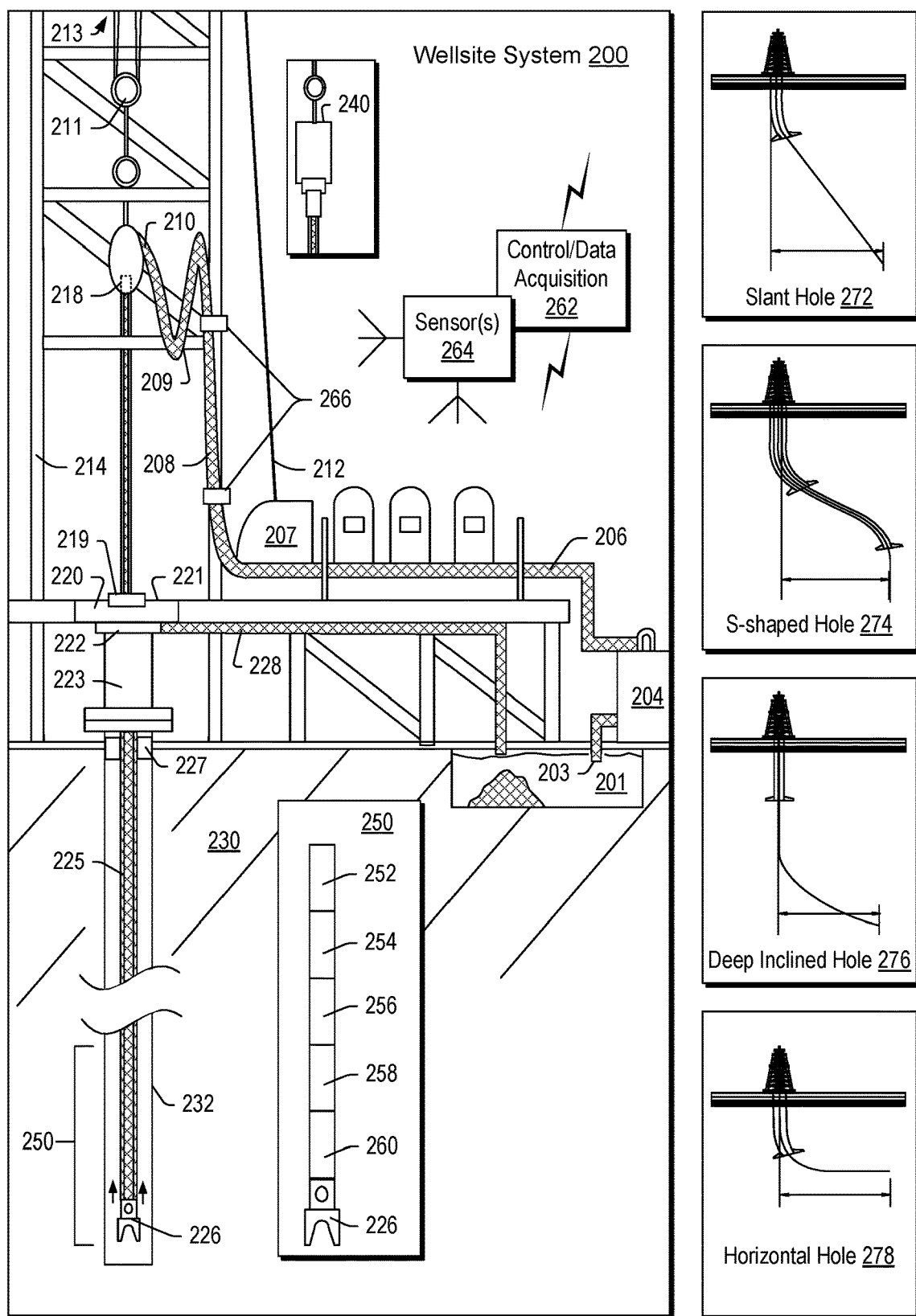
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, various types of operations can be performed using a system that includes memory and telemetry circuitry where the memory may be limited and/or where the telemetry may be limited.

As an example, various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or a borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. As an example, drilling can include using one or more logging tools that can perform one or more logging operations while drilling or otherwise with a drillstring (e.g., while stationary, while tripping in, tripping out, etc.). As an example, a wireline operation can include using one or more logging tools that can perform one or more logging operations. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, drilling or one or more other operations may occur responsive to measurements. For example, a logging while drilling operation may acquire measurements and adjust drilling based at least in part on such measurements. As an example, a logging operation can include moving a logging tool, stopping a logging tool, or otherwise controlling a logging tool based at least in part on measurements acquired by the logging tool or, for example, another logging tool (e.g., sensor unit, etc.).

As an example, a nuclear magnetic resonance (NMR) unit can be utilized to determine properties of objects, substances or objects and substances. In various operations, a downhole tool can include one or more NMR units that can acquire NMR measurements. Such measurements may provide for characterization of one or more objects, one or more substances, etc. Such measurements may be acquired using wireline technology, drilling technology (e.g., logging while drilling, etc.), or other downhole technology. As an example, NMR technology can be utilized in a geologic environment to characterize the geologic environment (e.g., formation characterization, fluid characterization, etc.).

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, NMR logging, assessment of one or more fractures, injection, production, etc. As an example, the equipment 127 and/or 128 may provide for measurement, collection, communication, storage, analysis, etc. of data such as, for example, formation data, fluid data, production data (e.g., for one or more produced resources), etc. As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe located at or near the center of a derrick or a mast and to throw a line around the pipe and pull it back into its storage location (e.g., fingerboards), for example, until a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 passes through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools (e.g., NMR unit or units, etc.). It will also be understood that more than one LWD and/or MWD module can be employed, for example, as represented by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device, an NMR measuring device, etc.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it is understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more NMR measuring devices (e.g., NMR units, etc.) may be included in a drillstring (e.g., a BHA, etc.) where, for example, measurements may support one or more of geosteering, geostopping, trajectory optimization, etc. As an example, motion characterization data can be utilized for control of NMR measurements (e.g., acquisition, processing, quality assessment, etc.).

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As an example, a trajectory and/or a drillstring may be characterized in part by a dogleg severity (DLS), which can be a two-dimensional parameter specified in degrees per 30 meters (e.g., or degrees per 100 feet).

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform a method such as geosteering. As mentioned, a steerable system can be or include an RSS. As an example, a steerable system can include a PDM or a turbine on a lower part of a drillstring where, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium. As an example, data acquired by an NMR unit may be processed in a manner that can reduce data load, which can facilitate transmission. For example, consider downhole processing of NMR measurements to reduce a total number of bits to be transmitted (e.g., consider downhole data compression, downhole data analysis, etc.).

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
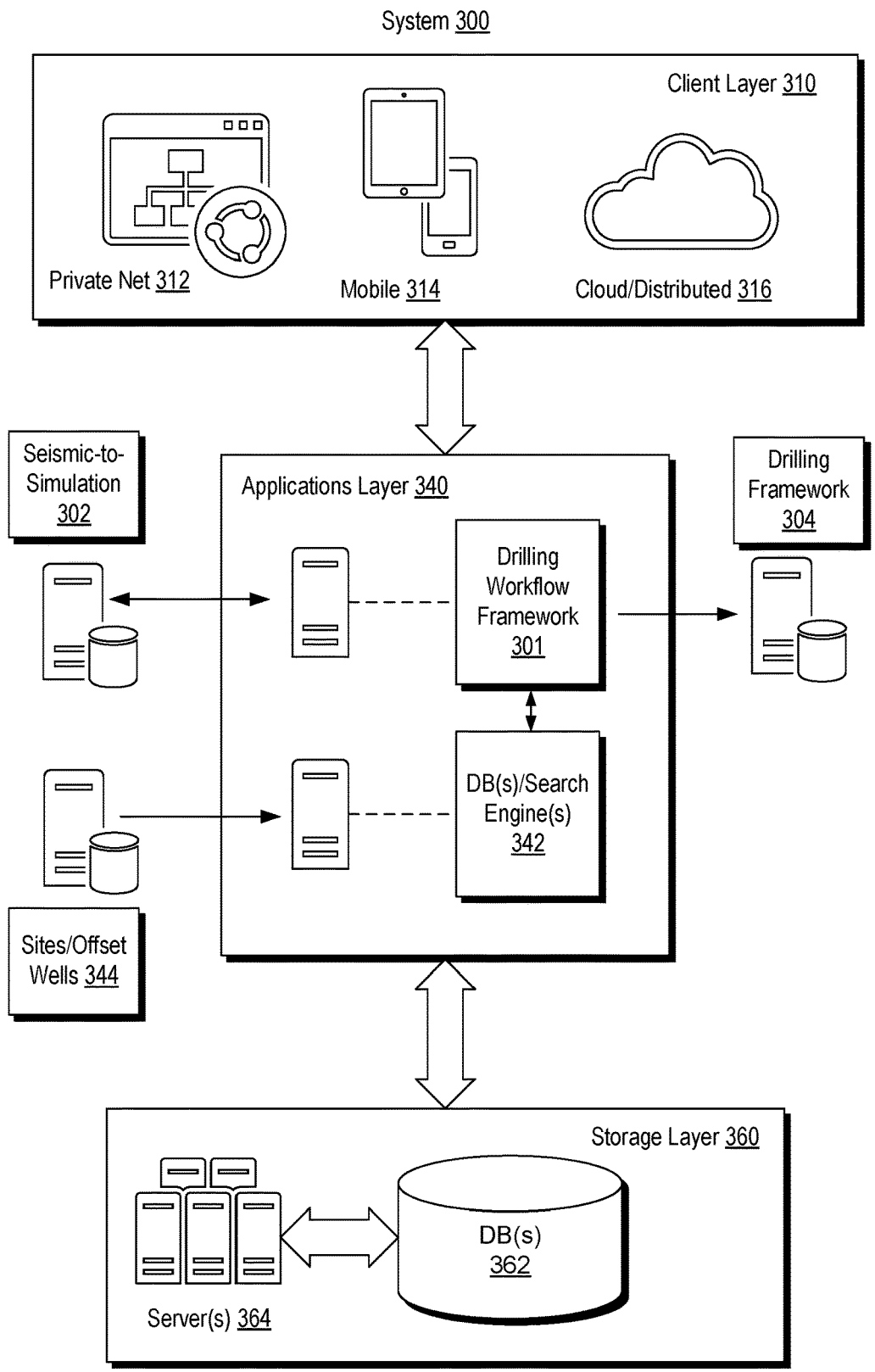
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360. In such an example, a computational framework may be provided for handling of logging measurements and/or data derived from logging measurements. For example, logging information may be provided to the seismic-to-simulation framework 302 and/or to the drilling framework 304. Such information may be utilized for model building (e.g., constructing a multidimensional model of a geologic environment), generating a trajectory for a well (e.g., or an extension thereof), generating a stimulation plan (e.g., fracturing, chemical treatment, etc.), controlling one or more drilling operations, etc.

In the example of FIG. 3, the client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engine features (e.g., sets of executable instructions to perform various actions, etc.).

As an example, one or more components may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering. As an example, an operation may involve logging via one or more downhole tools.

In the example of FIG. 3, the storage layer 360 can include various types of data, information, etc., which may be stored in one or more databases 362. As an example, one or more servers 364 may provide for management, access, etc., to data, information, etc., stored in the one or more databases 362. As an example, the database management component 342 may provide for searching as to data, information, etc., stored in the one or more databases 362.

As an example, the system 300 of FIG. 3 may be implemented to perform one or more portions of one or more workflows associated with the system 200 of FIG. 2. As an example, the drilling workflow framework 301 may interact with a technical data framework (e.g., a logging data framework, etc.) and the drilling framework 304 before, during and/or after performance of one or more drilling operations. In such an example, the one or more drilling operations may be performed in a geologic environment (see, e.g., the environment 120 of FIG. 1) using one or more types of equipment (see, e.g., equipment of FIGS. 1 and 2).

As an example, an architecture utilized in a system such as, for example, the system 300, may include features of the AZURE architecture (Microsoft Corporation, Redmond, Washington). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, California).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
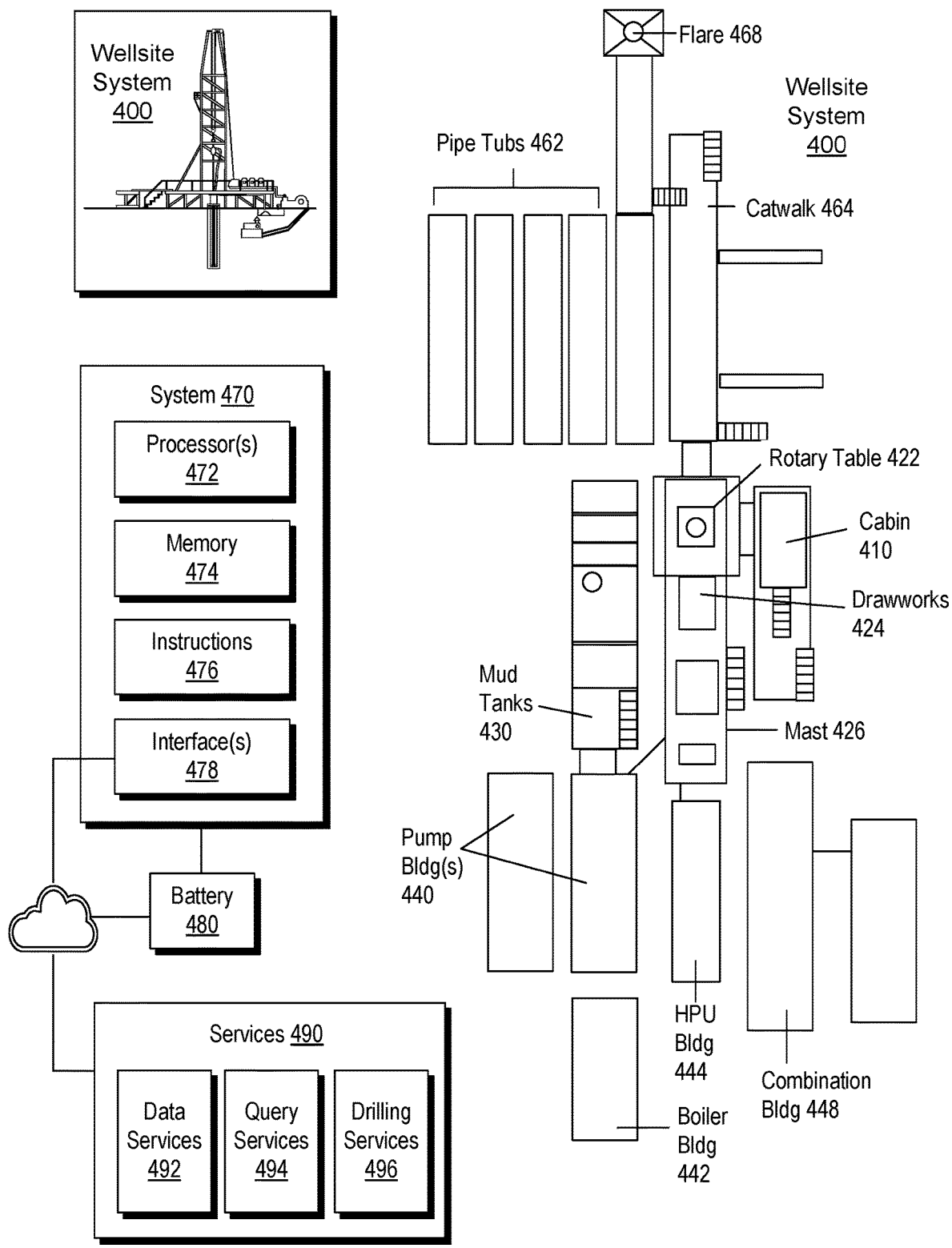
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, a hydraulic pumping units (HPU) building 444 (e.g., with a rig fuel tank, etc.), a combination building 448

(e.g., with one or more generators, etc.), pipe tubs 462, a catwalk 464, a flare 468, etc. Such equipment can include one or more associated functions and/or one or more associated operational risks, which may be risks as to time, resources, and/or humans.

A wellsite can include a prime mover as a source of power. As an example, a prime mover can include one to four or more diesel engines, which may produce several thousand horsepower. Such engines can be operatively coupled to one or more electric generators. Electrical power may be distributed by a silicon-controlled-rectifier (SCR) system. Rigs that convert diesel power to electricity may be referred to as electric rigs or diesel electric rigs. As an example, a rig can be configured for transmission of power from one or more diesel engines to one or more rig components (e.g., drawworks, pumps, rotary table, etc.) through mechanical belts, chains, clutches, etc. Such a configuration may be referred to a mechanical rig or a so-called "power rig".

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a system management bus (SMBus) or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace.

As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
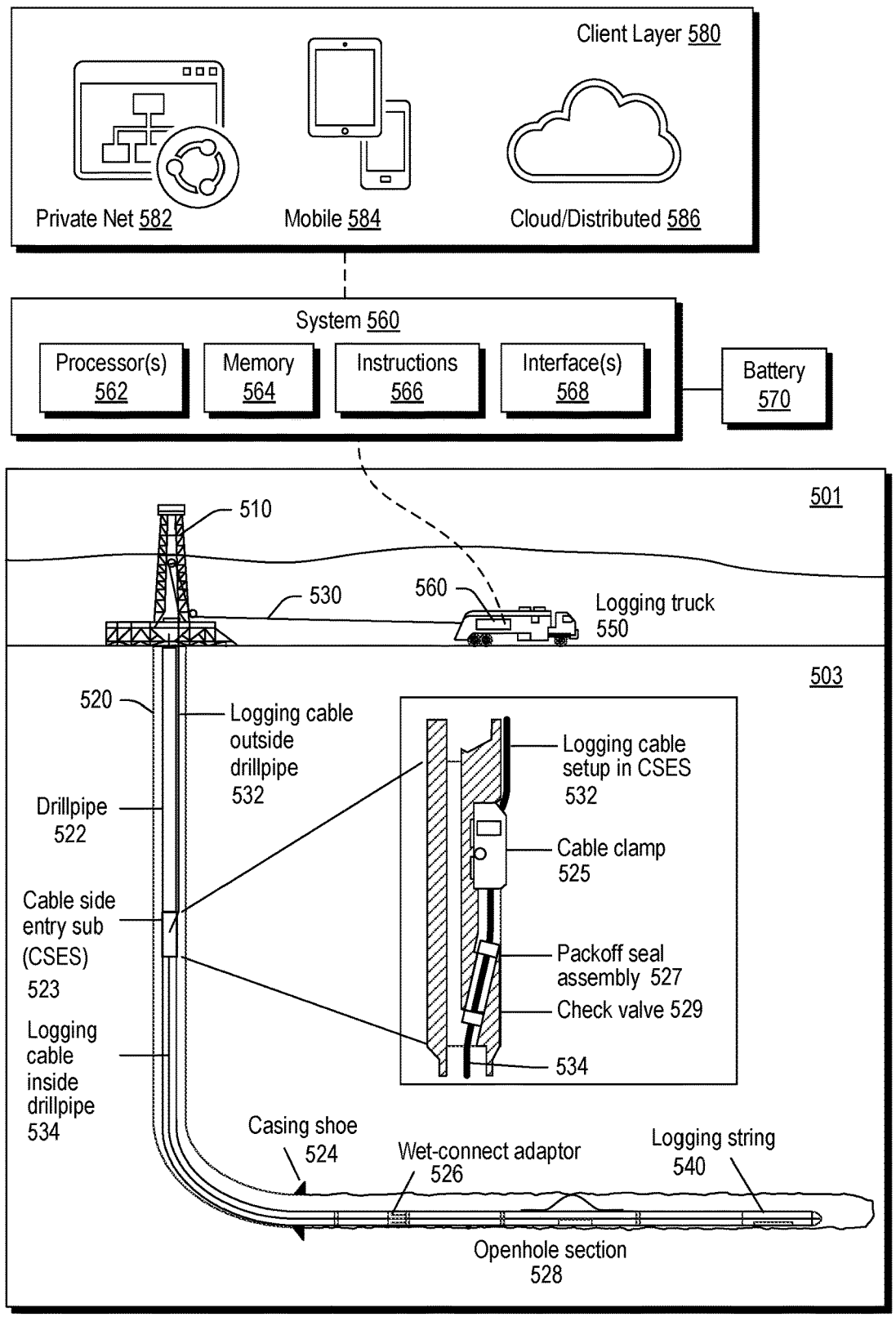
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe 524, a cable side entry sub (CSES) 523, a wet-connector adaptor 526 and an openhole section 528. While the drillpipe 522 is shown in the example of FIG. 5 along with casing, wireline operations may be performed in bores with or without drillpipe, with or without casing, etc.

As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

As an example, the logging string 540 can include one or more NMR units, which may be part of one or more tools that are movable via movement of the logging string 540.

FIG. 6 shows some examples of systems 600 and 650 where each of the systems 600 and 650 is a distributed system, which can be defined as a heterogeneous system. For example, the system 600 shows a system X 610 and a system Y 630, which can be in communication via one or more types of telemetry technologies. In such an example, the system X 610 and the system Y 630 can include telemetry circuitry. For example, the system X 610 can include a digital decision model (DDM) generator 612 that can generate a DDM 632 that can be transmitted to the system Y 630. In such an example, the system Y 630 can perform one or more actions that depend on the DDM 632 as stored local to the system Y 630 such as in memory of the system Y 630.

As to the example systems 650, these include an implantable medical system 651 where equipment is implanted in a mammal such as a human, a space exploration system 652 where equipment is in space outside of the atmosphere of the Earth, an implantable structural system 653 where equipment is embedded in a physical structure, a remote terrestrial system 654 where equipment is located at a location on the Earth or in the Earth, a periodic and/or bandwidth limited telemetry system 655 where equipment is configured, located, etc., with limitations, and one or more other types of systems 656.

As to the implantable medical system 651, consider an electronic medical therapy delivery system being implanted in a human body via a surgical procedure. In such an example, an external telemetry wand operatively coupled to an external system may be utilized to communicate with the internal, implanted system. In such an example, a hardware upgrade to the internal, implanted system may demand surgery, which may be contraindicated. In such an example, the internal, implantable system may be upgraded via download of an updated DDM. In such an example, the updated DDM may be updated using data acquired by the internal, implantable system and the updated DDM may provide for improved operation of the internal, implantable system (e.g., as to delivery of therapy, sensing signals, detecting conditions, etc.).

As to the space exploration system 652, consider a deep space vehicle system that has limited telemetry (e.g., time, bandwidth, etc.) and/or physical condition limited telemetry (e.g., due to location, solar radiation, etc.). In such an example, the deep space vehicle system can include hardware that is not amenable to upgrade and can include memory that can store a DDM, which may be updated via another system such as an Earth-based system or a system based on another planet, vehicle, station, etc.

As to the implantable structural system 653, consider a structural sensor system that is embedded in a structure such as a bridge, a dam, a nuclear power plant, a building, etc. In such an example, once embedded, hardware of the structural sensor system can be impractical. As an example, telemetry may be utilized to transmit a DDM to the structural sensor system to thereby update its operation.

As to the remote terrestrial system 654, consider an ocean bottom sensor system that is not readily amenable to hardware upgrade. In such an example, telemetry can be utilized to update a DDM of the ocean bottom sensor system. While the ocean is mentioned, consider a mountain deployed sensor system or a harsh environment deployed sensor system. Such examples may be limited in access, hardware upgrade, etc., and benefit from an ability to update a DDM to improve operation.

As to the periodic and/or bandwidth limited telemetry system 655, consider location, noise, technology, etc., as some examples of limitations in telemetry. Such a system may benefit from update of a DDM to improve operation.

FIG. 7 shows an example of a method 700 that includes a performance block 710 for performing an operation using a system where the operation depends on a decision made via a digital decision model stored in memory of the system; a transmission block 720 for, responsive to a decision state of the digital decision model, transmitting a request to update the digital decision model; and a reception block 730 for, responsive to the request, receiving an updated digital decision model, where the updated digital decision model includes at least one new decision state that improves performance of the operation of the system. As shown, the method 700 can also include a performance block 740 that performs the operation using the system according to at least one of the at least one new decision state.

The method 700 of FIG. 7 is shown as including various computer-readable storage medium (CRM) blocks 711, 721, 731, and 741 that can include processor-executable instructions that can instruct a computing system, which can be a control system, to perform one or more of the actions described with respect to the method 700.

As shown in the example of FIG. 7, the system 790 can include one or more computers 792 that include one or more processors 793, memory 794 operatively coupled to at least one of the one or more processors 793, instructions 796 that can be, for example, stored in the memory 794, and one or more interfaces 795. As an example, the system 790 can include one or more processor-readable media that include processor-executable instructions executable by at least one of the one or more processors 793 to cause the system 790 to perform actions such as, for example, one or more actions of the method 700. As an example, the instructions 796 can include instructions of one or more of the CRM blocks 711, 721, 731, and 741. The memory 794 can be or include the one or more processor-readable media where the processor-executable instructions can be or include instructions. As an example, a processor-readable medium can be a computer-readable storage medium that is non-transitory that is not a signal and that is not a carrier wave.

As an example, the system 790 can include subsystems. For example, the system 790 can include a plurality of subsystems that may operate using equipment that is distributed where a subsystem may be referred to as being a system. For example, consider a downhole tool system and a surface system as described with respect to FIG. 2, FIG. 4, FIG. 5, FIG. 6, etc. As an example, operations of the blocks 710, 720, 730 and 740 of the method 700 may be performed using a downhole tool system. The method 700 may be implemented using, for example, a downhole system and/or a surface system, which may be a cloud-based or cloud-coupled system.

As an example, the method 700 can be adaptive in that the digital decision model (DDM) can be utilized to determine a parameter or a parameter set using a first system that acquires measurements and/or results thereof and in that the DDM can be updated using a second system where the updated DDM is transmitted to the first system for further decisions making (e.g., determinations as to one or more parameters, parameter sets, etc.).

As an example, a system can perform operations according to one or more timers, event triggers, instructions, etc. For example, one type of remote system may perform sensing operations once a year, such a system takes several years to navigate a digital decision model (DDM); whereas, another type of remote system may perform sensing operations once a minute and be able to navigate a DDM in an hour or less. Such examples demonstrate that time may not necessarily be factor for determining when to update a digital decision model (DDM). As an example, time may be utilized, for example, in combination with a number of operations performed. Consider a system that is expected to perform a sufficient number of operations in a period of time to navigate a DDM to place the DDM in a state that is expected to call for an update. If that system does not call for an update in the period of time, a trigger may be utilized to "check-in" on the DDM to see if there is an issue with the system, the DDM, etc., which may result, for example, in generation of an updated DDM and transmission thereof to the system.

As explained, a downhole tool can be a system that may be positioned in different environments where different parameter sets may be utilized. A digital decision model (DDM) can provide for decisions as to selection of appropriate parameter sets for different environments. Such an approach may provide for improved operation of the downhole tool such as improved measurements (e.g., greater SNR), improve efficiency (e.g., power utilization, etc.), or one or more improved performance aspects.

Various examples are given with reference to downhole tools such as a downhole tool that can be utilized for NMR logging. Various equipment may be utilized in one or more other types of systems, such as, for example, one or more of the systems 600 and 650 of FIG. 6.

As mentioned, a combinable magnetic resonance (CMR) tool can be utilized for NMR logging. As an example, NMR measurements can be utilized for determining one or more of reservoir permeability, water cut, and hydrocarbon pore volume. As an example, NMR measurements may be utilized to evaluate porosity and permeability independent of mineralogy. As an example, NMR measurements may be suitable for characterizing thinly laminated reservoirs; low-contrast, low-resistivity pay zones; and carbonates.

As an example, a tool can include circuitry for implementing an enhanced-precision mode (EPM) pulse acquisition scheme to refine precision of NMR data associated with the smallest pores and heavy crude oils. As an example, processing of EPM acquisition data can provide total porosity along with partitioning into micro-, meso-, and macroporosity and estimates of the bound and free fluid. As an example, in complex lithologies, such information can facilitate determining the irreducibile water saturation and potential for water production.

As an example, a tool can include magnets such as permanent magnets that may extend above and/or below an antenna, which may be utilized for delivery of an oscillating magnetic field and/or receipt of responses from nuclei to a delivered oscillating magnetic field. As an example, consider a tool that includes magnets arranged above and below (e.g., approximately 12 cm above and approximately 12 cm below) an antenna (e.g., approximately 2.5 cm). Such an arrangement of components can be utilized to create a longer pre-polarizing field that can provide for increased logging speed (e.g., consider logging speeds to 1,200 meters per hour or more in a fast-relaxation environment).

As an example, an acquisition scheme can be implemented that provides for increased logging speed, increased vertical resolution and/or an arrangement of components (e.g., magnet(s) and antenna(s)) that may be beneficial to one or more logging operations. As an example, where total acquisition time of an acquisition scheme can be reduced, the length of an NMR unit may be reduced, which may reduce mass and demands of movement of a logging string (e.g., consider lesser energy for rotation of a reel, etc.).

FIG. 8 shows an example of a method 800 with respect to an NMR unit and a sensed region where the method 800 includes exposing the sensed region to a static magnetic field of the permanent magnet (or magnets), utilizing an antenna (e.g., or other transmitter) to generate an oscillating field that penetrates the sensed region, and utilizing the antenna (e.g., as a receiver) to receive energy released by nuclei in the sensed region. As shown, one or more components can be eccentric such that the NMR unit can have an orientation with respect to the sensed region, which can be a portion of a wall of a borehole.

FIG. 8 also shows an example of a tool 850, which can include one or more features such as a stabilizer, a pad, a turbine, etc. The tool 850 includes an NMR unit 870, for which an approximate cross-sectional view along a line A-A is shown. In the cross-sectional view, the NMR unit 870 is shown to include magnets 872, an antenna 874 and circuitry 880, which can include RF emission circuitry, antenna circuitry and analog-to-digital conversion circuitry (e.g., an analog-to-digital converter (ADC)). As an example, the NMR unit 870 can include one or more passages for one or more conduits. For example, consider a power conduit, a data transmission conduit, a power and data conduit, etc. As an example, the tool 850 can include a power source or be operatively coupled to a power source, which may be a fluid driven turbine (e.g., turbogenerator, etc.), a surface power source (see, e.g., the logging truck 550, the battery 570, etc.). As an example, a power source may be a power grid, a generator (e.g., gas, wind, fuel, etc.), a solar panel, a battery, etc.

As to the circuitry 880, it can include one or more processors and memory accessible to at least one of the one or more processors. For example, the circuitry 880 can include a processor that executes instructions that control energy emissions to generate an oscillating magnetic field, as may be according to a programmed pulse sequence. As an example, the circuitry 880 can include one or more switches, which may be operatively coupled to sources of energy, which can include a source to generate pulsed emissions and/or a source that is an antenna or antennas that receive signals from nuclei in a formation. For example, a switch may act to control an antenna to use the antenna for transmission of energy and then to use the antenna for reception of energy. Received energy can be directed to an analog-to-digital converter that can convert analog signals to digital data according to a selected sampling rate and/or bit depth. As an example, the digital data can be stored to memory and optionally processed by the processor (e.g., downhole) and/or transmitted to another processor, storage device, etc., which may be uphole or part of the downhole tool or another downhole tool. As an example, a processor or processors can be configured using executable instructions to perform one or more operations on data such as, for example, inversion to derive one or more values (e.g., $T_2$ values, $T_1$ values, etc.).

As shown in the example of FIG. 8, the circuitry 880 can include a sequencer 882, a transmitter 884, a receiver 886, and an ADC 888. The sequencer 882 can include instructions or otherwise be instructed to control the transmitter 884, which can be operatively coupled to the antenna 874 for transmission of oscillating magnetic fields. The receiver 886 can be operatively coupled to the antenna 874 for reception of echo signals where such signals can be in analog form and converted into digital echo data using the ADC 888. As shown in the example of FIG. 8, other circuitry 889 can be included, which may be operatively coupled to one or more data and/or power lines. For example, consider one or more data and/or power lines operatively coupled to an uphole (e.g., surface) unit or system. As an example, the sequencer 882 may be programmable via instructions, commands, etc., received from memory locally, from a surface unit or system, another component of a downhole string, etc. As an example, a method can include controlling emissions, which may be via RF emission circuitry. As an example, such circuitry can include the sequencer 882 and the transmitter 884 as operatively coupled to the antenna 874. As an example, a method can include acquiring digital echo data, which may be via antenna circuitry and analog-to-digital conversion circuitry. As an example, such circuitry can include the antenna 874, the receiver 886 and the ADC 888. As an example, compression circuitry may be included to compress digital echo data (e.g., consider one or more of window summing, singular value decomposition, etc.). Data compression may reduce data density for transmission of data uphole to a surface unit or system (e.g., via the circuitry 889, etc.).

As an example, the tool 850 can be dimensioned for receipt in a borehole with a diameter of approximately 10 cm or more, which may depend on features such as a centralizer, pads, etc. As an example, the tool 850 can be of a maximum diameter of a tool body of approximately 5 cm or more. For example, consider an outer tool body diameter of approximately 12 cm at an NMR unit (e.g., an NMR unit with a 12 cm cross-sectional dimension).

As an example, an NMR unit can be skid-mounted to cut through mud cake and for contact with a formation. As an example, contact may be enhanced through one or more components such as an eccentralizing arm or power calipers. As mentioned, internal permanent magnets can be utilized to provide a static polarizing magnetic field. As an example, an NMR unit may be sensitive to a volume of about 1 cm to 3 cm or more into a formation where the volume may extend a length of an antenna along a longitudinal axis of the NMR unit (e.g., 5 cm to 15 cm or more), which can be a factor in vertical resolution. As an example, an antenna can be operated as a transmitter, a receiver or both a transmitter and a receiver. As a transmitter, an antenna can transmit a sequence for an oscillating magnetic field (e.g., consider a CPMG pulse sequence, etc.). As a receiver, an antenna can receive pulse echoes from a formation, including substances in the formation such as one or more fluids.

Figure 9:
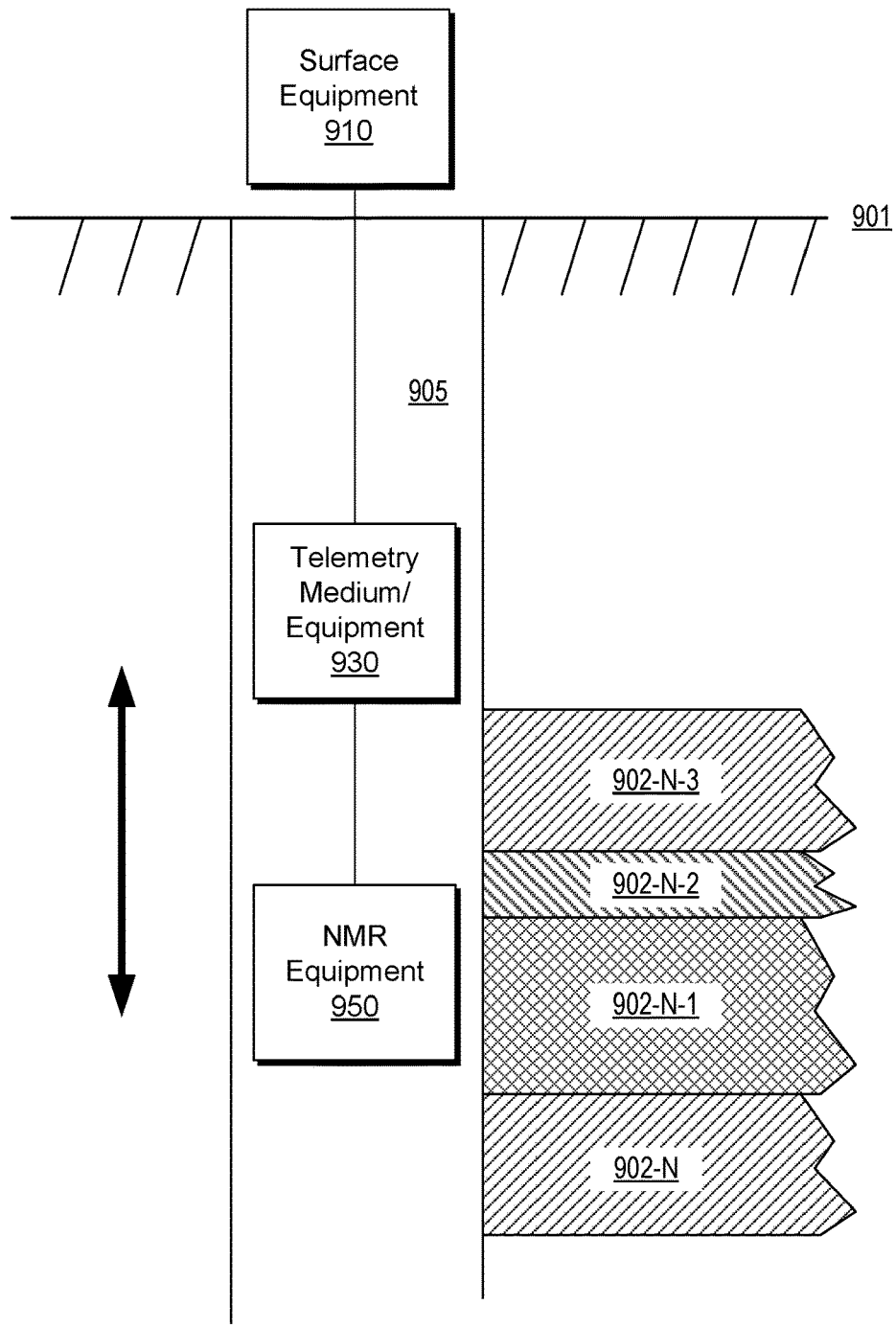
FIG. 9 illustrates an example of a system.

FIG. 9 shows an example of a system 900 with respect to a subsurface region that includes a surface 901, various types of formations 902-N-3, 902-N-2, 902-N-1, and 902-N, which may be referred to as formations 902 or individually as individual formations, and that includes a borehole 905 where the formations 902 define a wall of the borehole (e.g., a borehole wall). As shown in the example of FIG. 9, the formations 902 can be of different thicknesses, of different materials, and may be disposed at different angles with respect to the surface 901. As an example, the borehole 905 may be vertical or deviated. As an example, the borehole 905 may include a vertical portion and a deviated portion. As an example, in a deviated portion, the borehole 905 may traverse the formations 902 in a manner that increases path length such that the path length of the borehole 905 in each of the formations 902 is greater than the thickness of each of the formations 902.

As shown in the example of FIG. 9, the system 900 includes surface equipment 910, telemetry medium and/or equipment 930 and NMR equipment 950. As explained, whether the system 900 includes drilling equipment or logging equipment, the NMR equipment 950 can move in the borehole 905. For example, the NMR equipment 950 can be tripped in, move with drilling, tripped out, maintained at a stationary position, etc. As to movement of the NMR equipment 950, it may be referenced with respect to spatial coordinates, which may provide for a measured depth and/or a vertical depth. As an example, movement along the borehole 905 can be characterized with respect to velocity, acceleration, translation, vibration, rotation, etc.

In the example of FIG. 9, the NMR equipment 950 can be operated to acquire NMR data for the different formations 902. Where the formations 902 differ in their materials (e.g., types of materials, composition of materials, etc.), the NMR equipment 950 may operate more efficiently when an acquisition protocol is matched to one or more formation characteristics. For example, formation characteristics may result in different relaxation time constants (e.g., $T_1$ and/or $T_2$). In such an example, an acquisition protocol for a slow $T_2$ (e.g., AP1) may differ from an acquisition protocol for a fast $T_2$ (e.g., AP2). In such an example, if AP1 is applied to a non-optimal formation type (e.g., fast $T_2$), the resulting NMR data may be of lesser quality. For example, the NMR data may be of a lower signal to noise ratio (SNR). As an example, for NMR measurements, an acquisition protocol (AP) may be characterized by a pulse sequence (PS). As an example, the NMR equipment 950 can include circuitry that can automatically change an AP, which can include changing a PS.

As an example, the system 900 can include computational resources that can automatically adjust the NMR equipment 950, which may be responsive to a formation characteristic. In such an example, the telemetry medium and/or equipment 930 may be adjusted. For example, consider an adjustment to telemetry mode, compression of data, organization of data, etc.

As an example, as the NMR equipment 950 moves in the borehole 905, the NMR equipment 950 may be adjusted in real time such that one or more adjustments are made to the NMR equipment 950 based on one or more formation characteristics of the formations 902. Such an approach may provide for more efficient operation of the NMR equipment 950, which may provide improved SNR, improved power utilization, improved telemetry, etc.

As an example, the NMR equipment 950 can automatically adjust acquisition, for example, by selecting a particular acquisition protocol (AP) from a group of acquisition protocols (APs). As an example, an automatic adjustment may include adjusting one or more parameters of an acquisition protocol (AP).

As an example, the NMR equipment 950 can include and/or be operatively coupled to a trained machine model that can receive input and generate output. In such an example, the output may be utilized to control operation of the NMR equipment 950.

As mentioned with respect to FIG. 8, the NMR unit 870 (e.g., NMR equipment) can include the circuitry 880. Such circuitry may be "lightweight". As an example, NMR equipment can include a microprocessor that has associated specifications. For example, consider a microprocessor with a relatively low clock rate (e.g., less than 100 MHz). As an example, NMR equipment can include memory that has associated specifications. For example, consider random access memory (RAM) with a relatively low amount of memory (e.g., less than 10 MB).

FIG. 10 shows an example of a microprocessor 1000 that may be utilized in a downhole tool such as an NMR unit (e.g., NMR equipment) along with an example of circuitry 1080 that can include a plurality of microprocessors 1000-1, 1000-2, 1000-3, 1000-4, and 1000-5. As shown, the circuitry 1080 can include a modem processor 1000-1, a controller processor 1000-2, a sequencer processor 1000-3, a processing and diagnostics processor 1000-4, and an acquisition processor 1000-5. Also shown in the example circuitry 1080 of FIG. 10 are memory, an ADC, a transmitter, a receiver and an antenna (see, e.g., the circuitry 880 of FIG. 8).

As an example, the microprocessor 1000 can include various features such as registers, cache, memory (e.g., for instructions and data), busses, a clock, address generators, interrupts, logic units, etc. As an example, the microprocessor 1000 can include various features of an INTEL Corporation (Sunnyvale, California) microprocessor such as one or more of the NIOS family microprocessors (e.g., NIOS II, etc.). As an example, a microprocessor such as the microprocessor 1000 may be utilized with and/or include one or more features of a device such as the CYCLONE device (Altera, San Jose, California). For example, a CYCLONE III device can include a NIOS II family microprocessor. The NIOS II family of microprocessors includes a 32-bit embedded-processor architecture designed specifically for the ALTERA family of field-programmable gate array (FPGA) integrated circuits.

A NIOS II processor can include an instruction cache, 60 MHz clock, hardware multipliers, external SRAM (for executable code and data) such as 2 MB on a modem and on a sequencer and 4 MB on a controller along with 8 MB external cache for storing FPGA image and software and a 4 GB recording cache (controller coupled). In such an example, each FPGA can possess "system on a chip" (SoC) characteristics and custom instructions to tailor functionality to the specific portion of circuitry.

Figure 11:
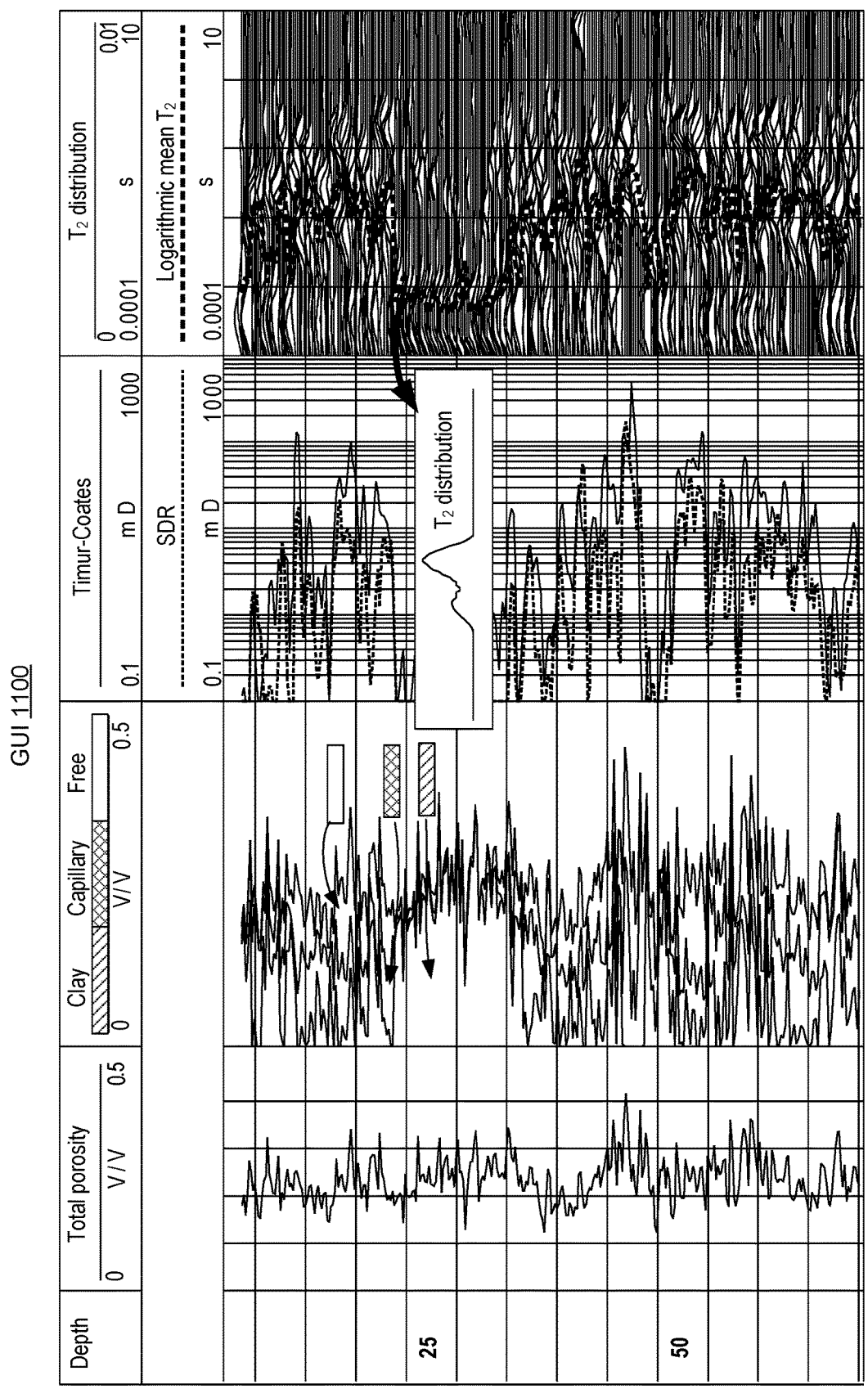
FIG. 11 illustrates an example of a graphical user interface.

FIG. 11 shows an example of a graphical user interface (GUI) 1100 that includes graphics derived from NMR data as acquired by an NMR unit of a downhole tool. The GUI 1100 shows four tracks in log form, with respect to depth and various other scales. The GUI 1100 may include, for example, a gamma ray track, which may help to provide indication of position (e.g., depth, measured depth, etc.). As shown, the first track includes a plot of total porosity (e.g., lithology-independent), the second track includes graphics of volumes of clay-bound water, capillary-bound water, and free fluid derived from a measured $T_2$ distribution, the third track includes permeability estimate graphics as derived using Timur-Coates and Schlumberger-Doll-Research (SDR) permeability equations and the fourth track includes the measured $T_2$ distribution as well as the logarithmic mean $T_2$ values at various depths.

As to depth, indicators as to 25 and 50 are shown, which can be utilized to determine a resolution (e.g., a vertical resolution, which may be with respect to a direction in vertical depth or a direction in measured depth). As may be appreciated, a higher vertical resolution can provide greater insight into characteristics of a formation.

As an example, a tool for NMR can include multiple sensors, including a large antenna for fluid characterization and complementary small aperture antennae for high-resolution acquisition modes. As an example, an automated switching method may optionally include switching of an antenna. As an example, a tool for NMR can include sensors that can be operated either separately or simultaneously at various logging speeds. For example, consider a tool that can operate at logging speeds up to 1,000 meters per hour or more. As an example, a tool for NMR can provide for analyses of responses for high-resolution identification of long $T_1$ fluids such as light hydrocarbons.

As to logging speed, consider the logging truck 550 of FIG. 5 as including a reel (e.g., a wireline reel, coiled tubing reel, etc.) that can be rotated by a motor to cause the logging string 540 to translate in the openhole section 528, which can be directional such as toward the end of the borehole (inwardly) or toward the surface of the borehole (outwardly). Such directional movement may be referred to as tripping in or tripping out. The logging speed can depend on the type of pulse sequence utilized for NMR and/or a switching method may include selecting a pulse sequence using one or more motion signals, etc. As an example, a pulse sequence that takes more time can result in slower logging speeds while a sequence that takes lesser time may result in faster logging speeds (e.g., depending on physical constraints of a system, an environment, etc.). In the example of FIG. 5, the logging truck 550 can include the system 560 where the system 560 controls a reel that controls movement of the logging string 540. For example, rotation of the reel can be controlled to achieve a desired logging speed of the logging string 540. As an example, logging may occur with continuous motion or with starts and stops. As an example, a logging speed may be an average speed that includes time(s) associated with one or more stop/start cycles.

Referring again to the GUI 1100 and the fourth track, $T_2$ distributions are illustrated graphically for a series of depths. The GUI 1100 shows a single $T_2$ distribution amplified to demonstrate that $T_2$ values can have a peak or peaks for a volume of investigation at a particular depth. As an example, a higher vertical resolution can provide for more $T_2$ distributions over a particular segment of a borehole. As an example, a sequence that can be executed in lesser time with acceptable data quality can provide for a greater logging speed, which may allow for receiving data for a segment of a borehole in a shorter period of time (e.g., more rapid formation evaluation, etc.).

As an example, a method can include various parameters such as a speed parameter, a number of NMR measurements at different depths per unit time parameter, a sequence duration parameter, a maximum speed parameter as to NMR measurements, a maximum speed parameter as to physical constraints on a logging tool and/or a logging system, a maximum data rate or bit rate for transmission of data from a downhole tool, a maximum processing rate as to processing of data (e.g., downhole and/or uphole), etc.

Figure 12:
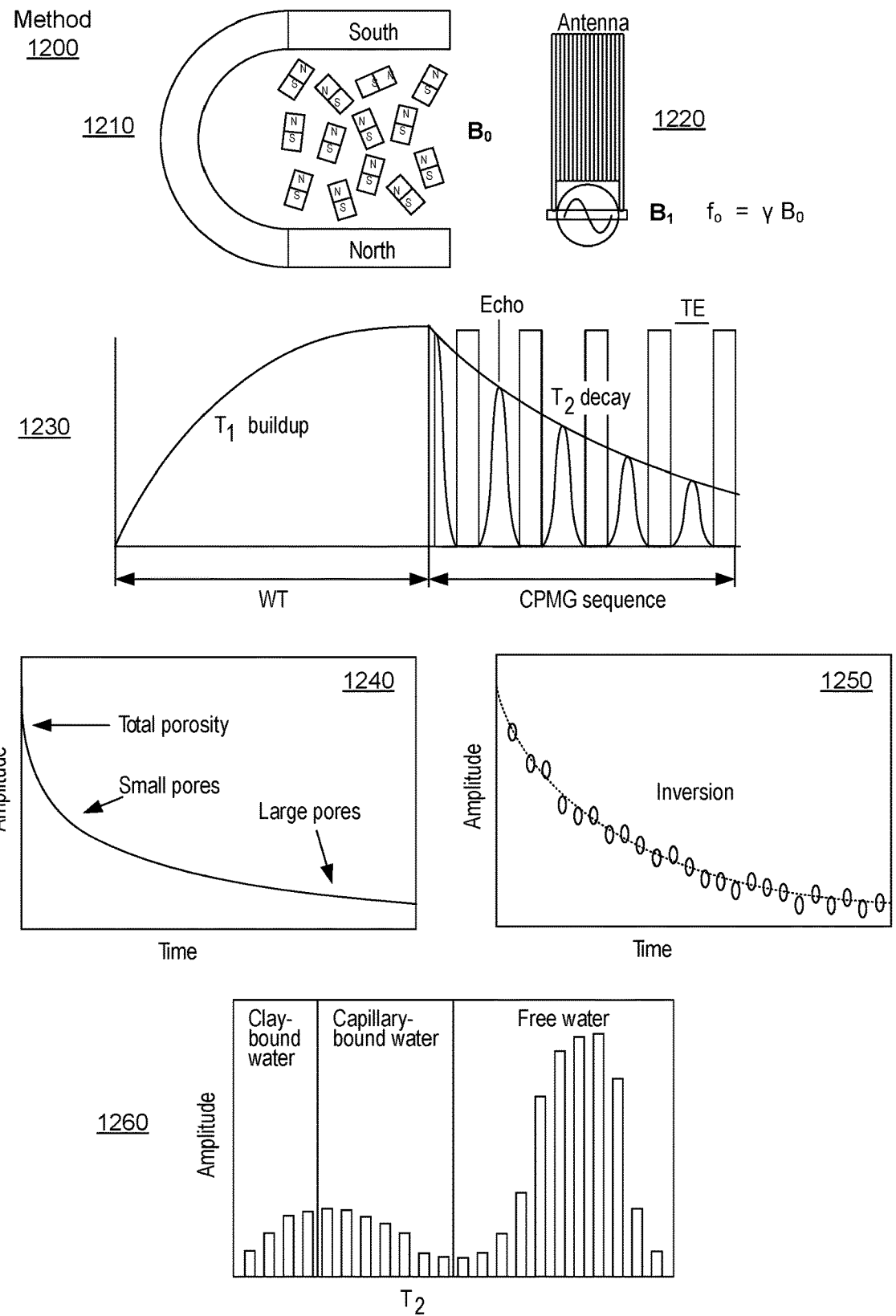
FIG. 12 illustrates an example of a method.

FIG. 12 shows an example of a method 1200 that includes various actions along with approximate graphical representations. The method 1200 includes an exposure block 1210 for exposing nuclei to a static magnetic field, an exposure block 1220 for exposing the nuclei to an oscillating magnetic field, a sequence block 1230 for performing the exposing according to a pre-determined sequence that includes data acquisition, an analysis block 1240 for analyzing at least a portion of acquired data, an inversion block 1250 for inverting at least a portion of the acquired data and converting a decay curve into a distribution of $T_2$ measurements and an analysis block 1260 for analyzing a distribution of $T_2$ measurements with respect to porosity (e.g., pore sizes in the formation investigated), which can correspond to water environments (e.g., clay-bound water, capillary-bound water, free water, etc.).

Hydrogen nuclei behave like tiny bar magnets and tend to align with the magnetic field of permanent magnets, such as those in an NMR logging tool. During a set wait time (WT), the nuclei polarize at an exponential buildup rate, $T_1$, including multiple components (C). Next, a train of RF pulses can adjust spins of the hydrogen nuclei causing them to tip 90 degrees and then precess about the permanent magnetic field where 180 degree pulses can re-focus the hydrogen nuclei at particular times. The formation fluids can generate RF echoes responsive to successive 180 degree pulses where the RF echoes are received and measured by the antenna of the NMR logging tool. The time between the 180 degree pulses can be defined as the echo spacing or echo time. The amplitudes of the echoes decay at a superposition of exponential relaxation times, Ta, which tend to be functions of pore-size distribution, fluid properties, formation mineralogy and molecular diffusion. As an example, an inversion technique can be applied that converts a decay curve into a distribution of $T_2$ measurements (see, e.g., $T_2$ distribution of the GUI 1100 of FIG. 11). In general, for brine-filled rocks, the distribution is related to the pore sizes in the rocks.

NMR logging can face various challenges such as one or more of the three challenges described below. First, it tends to be slow due to real world physics, specifically, the prolonged time to polarize hydrogen atoms in a static magnetic field; second, it tends to have poor SNR owing to the intrinsically weak coupling between nuclear spins and the instrument detectors; and third, an NMR logging program tends to demand substantial job planning, demanding local knowledge and domain resources and resulting in a lengthy operational workflow. Methods that reduce logging time, enhance SNR, and streamline job design are generally desirable.

NMR is a routinely used technique for reservoir characterization due to its capability of measuring the hydrogen nuclei in the fluids. As both water and hydrocarbons like oil and gas contain hydrogen nuclei, they can be measured and quantified by NMR tools. Furthermore, NMR measurement of sample properties, such as relaxation times ($T_1$ and $T_2$) and diffusion coefficients enable understanding of the dynamics of these fluids, resulting in the interpretation of their physical state (e.g., free or bound), the sizes of the pores they are confined in, the viscosity and type of hydrocarbons, and the permeability, and other properties of the rock system.

NMR relaxation such as measured by $T_2$ has been shown to be directly proportional to the surface-to-volume ratio of a porous material, $$1/T_2 = \rho S/V_p \tag{1}$$

where S is the total surface area of the material, $V_p$ is the pore volume, and p is the surface relaxivity.

Above, surface relaxivity p is a quantity (in units of micron/second) that defines the strength of the surface relaxation phenomenon. Because of this relationship, NMR is used in petroleum exploration to obtain estimates of porosity, pore size, bound fluids, permeability, and other rock and fluid properties (e.g., "petrophysical data"). For example, it is known that a $T_2$ distribution is closely related to the pore size distribution. Reservoir rocks often exhibit a wide range of $T_2$s due to the difference in pore sizes, with observed $T_2$ from several seconds down to tens of microseconds. Signals at long $T_2$ (e.g., greater than 100 milliseconds) tend to be from large pores and such fluids may be considered producible. For shorter $T_2$ signals (e.g., 3 milliseconds to 50 milliseconds), the fluids are often considered to be bound by capillary force of the pores. For example, fluids in sandstone rocks with $T_2$ below 30 ms are considered bound by capillary force and tend not to produce. Thus, a cutoff value, $T_2$ cut (e.g., $T_2$ cut=30 ms) can be used to calculate the bound fluid volume:

$$BFV = \int_{T_2 min}^{T_2 cut} f(T_2) dT_2 \tag{2}$$

where $f(T_2)$ is the $T_2$ distribution, and $T_2$ min is the minimum $T_2$ obtained in the $T_2$ distribution.

For a fully saturated sample, porosity can be obtained by integrating $f(T_2)$ through the entire $T_2$ domain as:

$$\int_{T_2 min}^{T_2 max} f(T_2) dT_2 \tag{3}$$

where $T_2$max is the maximum $T_2$ exhibited in the sample. Signals with even shorter $T_2$ (e.g., $T_2$ less than approximately 3 milliseconds) can be due to clay bound water or viscous (heavy) hydrocarbon. Some rocks contain a substantial amount of kerogen that is solid organic matter and may exhibit $T_2$s down to tens of microseconds.

As explained, NMR measurements can be acquired using specially designed data acquisition schemes (e.g., pulse sequences) which describe the timings of transmission and reception of electromagnetic signals. A pulse sequence for the measurement of $T_2$ relaxation time distribution can be a CPMG echo train.

As an example, signals of an echo train can be acquired. As an example, a signal amplitude, D, can be measured as a function of the echo time, $t_{echo}$, (the time of the echo from the beginning of the first 90-degree pulse), $$t_{echo} = n*TE \quad (4)$$

where n is the number of echo and TE is the echo spacing (e.g., the time between two adjacent 180-degree pulses). The signal amplitude tends to follow an exponential decay form, $$D(t_{echo}) = S(0)\exp\left(-n*\frac{TE}{T_2}\right) \quad (5)$$

for a sample of a single $T_2$.

For samples embodying a range of $T_2$ distribution, the total signal is a sum of $T_2$ components, $$D(t_{echo}) = \int dT_2 f(T_2)\exp\left(-n*\frac{TE}{T_2}\right) \quad (6)$$

where f(T2) is the $T_2$ distribution. In practice, fluid properties other than $T_2$ are measured by a wide variety of pulse sequences. For example, relaxation time $T_1$ is measured through inversion or saturation recovery pulse sequences, and translational diffusion coefficient, $D_c$, is measured by diffusion-editing or pulse-field gradient pulse sequences.

In an inversion-recovery $T_1$ measurement, the echo signal may be determined by the following equation:

$$D(t1) = \int dT_1 f(T_1)\left(1 - 2\exp\left(-\frac{t1}{T_1}\right)\right) \quad (7)$$

where t1 is often called the "encoding time."

In practice, a list of t1 values can be used to measure the signal, and the resulting signal D(t1) is subsequently inverted to obtain the sample $T_1$ distribution, $f(T_1)$. An optimal choice of a {t1} list may be a function of sample $T_1$ distribution. For example, with $T_1$=1 ms, maximum t1 can be under 5 ms; while when $T_1$=1 s, {t1} can cover as long as 5 s. As an example, a method can include determining in real-time a {t1} sequence that suits the acquisition parameter for specific material under study.

A combination of pulse sequences can simultaneously measure more than one NMR property of fluids. For example, a combination of inversion recovery and CPMG sequences can provide a two-dimensional mapping of fluid $T_1$-$T_2$ distribution—a technique that can be utilized in evaluating shale and tight formations. High-dimensional measurements can be particularly time consuming as they demand traversing through a high-dimensional pulsing parameter table.

As an example, parameters {t1, t2} can be parameters of a pulse sequence where a signal can be determined by:

$$D(t1,t2) = \int dT_1 dT_2 f(T_2,T_1)(1-e^{-t1/T_1})e^{-t2/T_2} \quad (8)$$

where $f(T_2, T_1)$ is the joint distribution of $T_1$ and $T_2$ relaxation times of the material under investigation.

As an example, a few parameter sets (e.g., sets of different {t1 t2} values) may be prepared while engineering an NMR tool, individually optimized for different formation types (shale, heavy oil, light oil, etc.). As to entering and exiting a formation layer during a logging operation, as an example, a method may be utilized that can include selecting one of the optimized pulse sequences for execution. Such an adaptive approach can involve real-time modeling of acquired NMR signals.

As an example, an NMR measurement may be described by a series of time sequences of RF pulses, gradient pulses, data acquisition, and synchronized operations of peripheral circuitries, such as duplexers. In such an example, each element of the time sequence can be further characterized by system parameters, such as duration, phase, amplitude and duty-cycle of RF and gradient pulses. Consider parameters such as p1, p2, . . . , and a suite of parameters as P={p1, p2, . . . }.

As an example, an approach as to determining parameters P can be utilized for one or more other types of instruments, which may be various logging instruments with or without NMR capabilities. For example, consider transmission power/current, receiver sensitivity, bandwidth, and frequency for various downhole tools (e.g., EM tools, etc.); and/or one or more of detector acquisition window, pulse neutron power, and pulse rate for nuclear downhole tools.

As an example, real-time optimization can provide for improvements to data quality and/or operational efficiency and/or, for example, preserving useful lifetime of an instrument or instruments with a common power supply, common telemetry circuitry, etc. As an example, a heterogeneous computing infrastructure may help reduce hardware functionalities, optimize performance and lower overall cost for instrument designs.

In addition to NMR well-logging, one or more other types of multi-dimensional NMR spectroscopy experiments may utilize one or more methods to improve measurement robustness and/or to accelerate (e.g., simplify) planning. As an example, NMR properties measured in a spectroscopy experiment may include chemical shift, spin-spin coupling, heteronuclear interactions, spin spatial dependence, etc.

As an example, a method can be an iterative procedure of quantifying forward model uncertainty at a workstation, porting the quantification results to a regression-tree, loading the tree to an edge device, feeding back acquired data and flag back to the workstation. In such an example, elasticity attributes of a regression-tree can allow for accommodating various limits (e.g., consider edge device limits as to fast memory such as RAM) and/or limits as to incomplete knowledge about one or more samples under study.

As an example, an approach can utilize a system that is distributed, for example, a system that utilizes a combination of high-performance computing (HPC) and edge computing infrastructures for automating and optimizing logging operations, where data acquisitions are dynamically adjusted with an incremental knowledge of a reservoir. An adaptive approach can be utilized with an aim to improve efficiency and quality of data acquisition and to automate job planning.

As an example, a digital decision model (DDM) can be implemented in an elastic manner where "elasticity" is based on its operation, for example, to update the DDM.

As an example, a DDM can be a tree type of model where states of the model are determined by decisions made. For example, a decision may correspond to a leaf of a tree, which can be a terminal leaf at a particular level of resolution of one or more operational parameters (e.g., a parameter, a parameter set, etc.) that is or are utilized to dictate how a system performs an operation or operations. As an example, a terminal state can be a state where a tree is at a terminal leaf, which may cause a system to perform in a less than possible optimal manner. In such an example, the system can transmit a request, optionally along with data, to a remote system that can generate an updated digital decision model (DDM) for subsequent transmission to the system for use in decision making as to how one or more operations are performed. Such an approach can result in elasticity as to operations and, for example, extensibility in that a decision may result in performance of a new or different type of operation. As an example, a method can include elastic regression-tree learning in a heterogeneous computing environment.

As mentioned, a system may include one or more sensors where the system may be implanted, remote, embedded, etc. In such a system, intelligence may demand performance of a sensor function with minimal operator interference.

As mentioned, even where computing resources may be in close proximity to a system, a hardware upgrade to that system may be limited (e.g., consider surgery to upgrade hardware in an implanted medical system). As mentioned, a system may suffer from latency, for example, in long-range data transmission (e.g., consider downhole equipment, outer space equipment, etc.).

As an example, a workflow can provide for optimizing sensor performance of the same sample and/or for different samples. For example, a same sample may be for a structural sensor system embedded in a bridge where changes may be expected to occur over time; whereas, for different samples, consider a downhole tool that is conveyed in a borehole to sense physical properties of different samples with respect to position (e.g., depth) in the borehole.

As an example, an elastic regression-tree method can provide for distributing computing tasks between an embedded chipset (e.g., a hardware limited system) and a computing workstation (e.g., a hardware upgradeable system, a cloud-based system, etc.). A reconciliation of computing resources of different natures can allow for efficient data acquisition in an automated manner, for example, as may be involved in deployment of edge intelligence systems.

In the field of subsurface measurements of oilfield exploration reservoir conditions of extreme temperature and pressure (e.g., greater than 150 degrees C. and greater than 1,000 atmospheres) can pose challenges towards deploying artificial intelligence (AI) types of units. As mentioned, a system may be constrained or otherwise limited such that there is a desired to more fully leverage an embedded environment of limited capacity for sensor optimization and automation.

As to an example of a heterogeneous system, consider the example specifications in Table 1 below.

TABLE 1

Example embedded MCU vs. full-fledged workstation.

| Attribute | Microprocessor | Workstation |
| --- | --- | --- |
| CPU clock-rate | 10 s-100 s MHz | GHz |
| RAM | 10 s KB-MB | 10 s GB |
| Latency | <µs | ms-10 s |

As explained, one or more sensing elements may be co-located with a low-latency, low-throughput microprocessor (MCU), for example, of tens of MHz-range CPU clock-rate and of MBs fast memory. As an example, a sensor-MCU envelope may interface to one or more workstations or cloud servers of much greater capability, for example, by tethered cables or a wireless mechanism. However, in some instances, a connection may be slow and/or of limited bandwidth.

FIG. 13 shows an example of a system 1310 and an example of a system 1350. As shown, the system 1310 includes a system 1311 that is constrained in one or more manners and includes circuitry such as a sensor 1312, a microprocessor unit (MCU) 1313, memory 1314 and an interface 1315. The system 1310 can acquire data using the sensor 1312 according to one or more parameters as may be set by the MCU 1313 that can depend on execution of instructions stored in the memory 1314 where the instructions can be received, at least in part, via the interface 1315 as can be transmitted by a workstation system 1318 where telemetry between the system 1311 and the workstation system 1318 is limited. As shown, the system 1311 may transmit information (e.g., data, etc.) to the workstation system 1318 via the interface 1315. The system 1310 is heterogeneous in that the circuitry of the workstation system 1318 differs from the circuitry of the system 1311 where, for example, the workstation system 1318 can be, for example, readily hardware upgraded, can include more memory than the memory 1314, can include processing circuitry that is more powerful than the MCU 1313, etc.

As shown, the system 1350 includes a system 1351 that is constrained in one or more manners and includes circuitry such as a sensor 1352, a microprocessor unit (MCU) 1353, memory 1354 and an interface 1355. The system 1350 can acquire data using the sensor 1352 according to one or more parameters as may be set by the MCU 1353 that can depend on execution of instructions stored in the memory 1354 pertaining to a digital decision model (DDM) where the DDM and/or the instructions can be received, at least in part, via the interface 1355 as can be transmitted by a workstation system 1358 where telemetry between the system 1351 and the workstation system 1358 is limited. As shown, the workstation system 1358 includes a DDM generator 1359, which may operate to generate one or more DDMs as may be transmitted to the system 1351 for storage in the memory 1354 and utilized for decision making as to one or more parameters for operation of the sensor 1352 to make measurements, etc. As an example, the DDM generator 1359 and/or the workstation system 1358 may assess and/or otherwise account for model uncertainty (e.g., model uncertainty quantification). As an example, the DDM generator 1359 may provide for elastic regression-tree generator. As shown in the example of FIG. 13, the system 1351 may transmit information (e.g., data, etc.) to the workstation system 1358 via the interface 1355. For example, the system 1351 may transmit data and/or one or more flags (e.g., Fn, where "n" is a flag index for a type of flag), which can be utilized by the workstation system 1358 to operate and/or call upon the DDM generator 1359 to generate a new DDM which may be transmitted to the system 1351. The system 1350 is heterogeneous in that the circuitry of the workstation system 1358 differs from the circuitry of the system 1351 where, for example, the workstation system 1358 can be, for example, readily hardware upgraded, can include more memory than the memory 1354, can include processing circuitry that is more powerful than the MCU 1353, etc.

As an example, the memory 1354 of the system 1351 can include instructions stored therein, for example, consider processor-executable instructions of one or more of the CRM blocks 711, 721, 731 and 741 of the method 700 of FIG. 7 being stored in the memory 1354 and being executable by the MCU 1353 to cause the system 1351 to perform one or more actions of the method 700 of FIG. 7.

In the system 1351, the DDM can be elastic in that it can be replaced or otherwise revised via external equipment such as the workstation system 1358. As an example, external equipment may be a database that is accessible by the interface 1355, directly and/or indirectly, where a search may be performed to select or otherwise generate a DDM for transmission and use by the system 1351. As an example, a database can include a plurality of DDMs and/or portions thereof that can be selected in response to a flag or flags and/or data as acquired by the sensor 1352 and/or data generated at least in part via the acquired data. The memory 1354 can be of a size that is limited in that a single DDM or less than several DDMs may be stored therein, which may be insufficient to provide for optimal operation of the system 1351. Where DDM replacement can occur, the system 1351 can operate in a more optimal manner, which may be for purposes of improving quality, quantity, etc., of the data acquired by the sensor 1352 (e.g., or sensors, etc.).

In the example systems 1310 and 1350, there is a juxtaposition of a MCU and a workstation, which can demand a proper allocation of computing tasks between the two. The systems 1310 and 1350 can be heterogeneous computing environments, in which a low-latency, low-throughput MCU can be used in conjunction with a high-latency, high-throughput workstation.

As mentioned, the system 1350 can be elastic in that a digital decision model (DDM) can be updated dynamically, for example, according to one or more states, which may be indicated by data, flag(s), etc. As an example, the system 1350 can be operated in accordance with the method 700 of FIG. 7.

As an example, a method such as the method 700 of FIG. 7 can involve optimizing the performance of one or more sensors that operate with one or more regression models, in which inputs are measurement parameters (p) and sample properties (q) of interest, and outputs are obtained signals (e.g., measurements, data, etc.). In such an example, an optimization goal can be to query at sequences of measurement parameters p, so that the sample properties q may be efficiently derived. As an example, a DDM can be utilized to make decisions as to one or more parameters, which can be operational parameters of circuitry such as, for example, sensor circuitry (e.g., one or more sensors, etc.) and/or circuitry operatively coupled to one or more sensors.

As an example, an approach may utilize a model-based optimal experimental design (OED), which, in general, may be pursued in two approaches; the first, called batch design, plans measurements concurrently with predetermined measurement parameters derived from a knowledge of the range of sample properties; and the second, called sequential design, allows a continuous optimization procedure, such that the measurement parameters for new acquisitions are optimized based on the existing data from the previous acquisitions.

Batch optimization, largely based on the Cramer-Rao lower bounds (CRLB) theory, aims at minimizing the variance of an unbiased estimator of deterministic quantities in a one-shot manner. Such an approach demands a reasonable prior knowledge of the sensor system, in particular the probable values of sample properties under study. Efficacy of the optimization routine can degrade as greater uncertainties are present in the initial assessment of those properties.

As an example, a method can include considering properties whose values can span over several orders of magnitude (e.g., as may be encountered in practice, such as the geophysical parameters of petroleum reservoirs), and optionally with limited a priori information available. In such a method, a sequential approach can be employed.

As an example, a method can include setting up an algorithmic framework for sequentially optimizing data acquisitions, for example, based on a given regression model, numerical ranges of sample properties and instrument parameters, and characteristics of the sensor noise.

As an example, given limited telemetry and meager throughputs of some embedded chipsets in some environments, a method can include formulating a regression-tree routine that executes a sequential optimization algorithm in real-time at a system that includes such an embedded chipset in such an environment. As an example, a method can include performing one or more actions that can cope with limitations of instrument and sample anomalies, for example, by introducing elasticity attributes that incorporate automatic updates (e.g., requested updates, triggered updates, etc.) to a digital decision model (DDM) (e.g., a tree, etc.), for example, with newly acquired information of a sample. As mentioned, various examples are given with respect to downhole tools, for example, where NMR measurements are acquired according to one or more parameters where decisions as to what parameter or parameters to use can be made via a DDM.

As an example, consider a class of nonlinear regression models, f, that can be used to describe a physical measurement:

$$S = f(q, p) + \varepsilon, \qquad (9)$$

where q represent the physical properties of the sample, p are the instrument parameters, $\varepsilon$ is the instrument noise of known character, and S is the generated signal.

A goal can be to optimize the acquisition sequence, $\{p_i\}$ (where i=1, 2, ..., N), so that the sample properties q may be derived with the fewest iterations N from the acquired signals, $\{S_i\}$, to the accuracy bounded by the instrument noise. Possible values of $p_i$ can be selected from a fixed pool of measurement parameters, $\Pi_p$. As explained, the optimal parameters $\{p_i\}$ can be sample dependent and dynamically determined as further data points $S_i$ become available.

Figure 14:
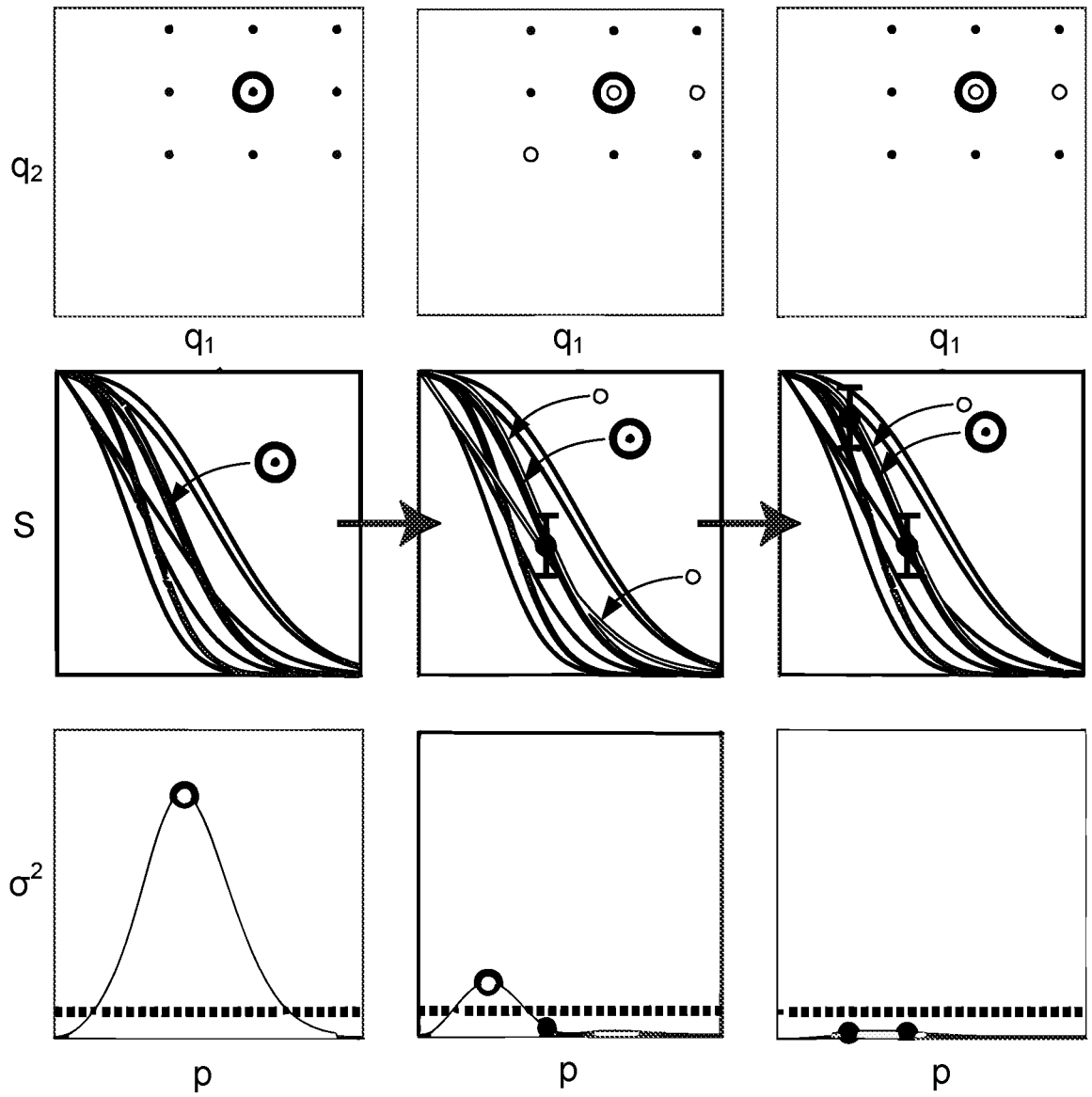
FIG. 14 illustrates examples of plots.

FIG. 14 shows a series of plots 1400 for three consecutive acquisitions, A, B and C, guided by the quantification of model uncertainties. The first row is the sampling space, $\Pi_q$, with black dots representing the sampling points, open circles representing the SE after each acquisition, and the large circle representing the true sample properties, $\{q_1, q_2\}_0$. The second row is the p-domain signals, with thin black traces representing the constructed data sets from original $\Pi_q$, open traces from SEs, the thick black trace from $\{q1, q2\}_0$, and black dots with error bars representing the acquired data. The third row is the calculated variance, $\sigma^2$, for the Solution Ensemble at each p in $\Pi_p$, with the open/solid circles representing the variance before and after an acquisition, and the dashed line representing the instrument noise level. The regression model in the example of FIG. 14 is according to Equation 15.

As to quantification of model uncertainties, a method can include assessing one or more portions of acquired data. For example, an acquired data-point can be utilized to expand knowledge about a sample under study to a desired extent. In such an approach, information gained from prospective data acquisitions can be quantified. For example, consider uncertainty sampling where an optimization routine can query at the parameter p and where the response S is least constrained.

To construct the statistics of probable measurement responses, consider a numerical space, $\Pi_q$, of a set of numerals for sample properties $\{\tilde{q}\}$. The construct of $\Pi_q$ demands prior information about the measurement system and about the sample.

Given N acquired data, a subset of $\Pi_q$ alone can be consistent with the regression model f. To obtain the subset, a workflow may use the method of least squares as a criterion to accept or reject a tentative q̃. Specifically, an accepted value of q̃, in light of signals $S_i$ at $p_i$ (i=1, 2, ..., N), satisfies:

$$\chi^2 = \frac{1}{N}\sum_i |S_i - f(p_i, \tilde{q})|^2 < \sigma_{IS}^2, \quad (10)$$

where σls 2 scales with the variance of the instrument noise ε. In such an example, an accepted q̃ can be constrained by the available data points, a solution to the model and a collection of solutions Solution Ensemble (SE). In such an approach, a large size of SE means great model uncertainties, which can be reduced as more data points become available.

Acquisitions at different $\Pi_p$ do not necessarily generate equal information gains. In general, the possible responses of a measurement may be tightly constrained in a neighborhood of past acquisitions at $p_i$ (i=1, 2, ..., N); yet they generally may have a wider range at other values of p. As an example, a method may aim to select $p_{N+1}$ at which the response is least constrained by the already-acquired data.

As an example, a method can include calculating a suite of constructed signals $\tilde{S}(p)=f(p, \tilde{q})$, where $\tilde{q} \in SE_N$ after the $N^{th}$ acquisition. Subsequently, such an approach can compute the variance of $\tilde{S}(p)$, $\sigma_{\tilde{S}(p)}^2$, at each p in $\Pi_p$ (e.g., noting that one or more other approach may be utilized as to variance). In such an approach, a large value of $\sigma_{\tilde{S}(p)}^2$ implies that the response is poorly constrained and provides an opportunity to yield a sizable information gain. To maximize the gain, a method can include setting the next p as $p_{N+1}$ using the following approach, which is referred to herein as Equation 11:

$$p_{N+1} = \operatorname{argmax} \sigma_{\tilde{S}(p)}^2 \quad (11)$$
$$p \in \Pi_p$$

As an example, a method may proceed iteratively where an iteration of the procedure can be carried out until a maximum variance falls below the instrument noise floor, as illustrated in the plots 1400 of FIG. 14.

As an example, a workflow can include: Establishing a regression model, a pool of measurement parameters, $\Pi_p$, and of sample properties, $\Pi_q$, and measurement noise, ε; acquiring one data point with p1 generating a Solution Ensemble (SE) by sampling in $\Pi_q$ and subjecting the tentative solution to Equation 10 (above); using the Solution Ensemble to construct a set of possible responses at the measurement parameters in $\Pi_p$; locating $p_2$ that corresponds to the maximum variance in the synthetic data set; acquiring the next data point with $p_2$; and iterating from the using the SE, the locating and the acquiring and exiting when either the maximum variance falls below the instrument noise floor or the Solution Ensemble vanishes, an indication that the acquired data is inconsistent with the assumed regression model.

As an example, a workflow can include sampling in $\Pi_q$ and subjecting tentative solutions to the test of Equation 10 (above), which may be relatively computationally expensive. As an example, the sampling space $\Pi_q$ can demand updating as the prior knowledge increases over subsequent iterations. Such demands can be considered to be relatively substantial and performed by a workstation rather than an embedded microprocessor.

As an example, a workflow can include sampling in $\Pi_q$ and subjecting tentative solutions to the test of Equation 2 (above), which may be relatively computationally expensive. As an example, the sampling space $\Pi_q$ can demand updating as the prior knowledge increases over subsequent iterations. Such demands can be considered to be relatively substantial and performed by a workstation rather than an embedded microprocessor.

As explained, to accommodate reduced computing throughputs at an edge system (e.g., with an embedded microprocessor), an adaptive acquisition algorithm can be ported to a multiclass regression-tree, which can be a digital decision model (DDM).

Figure 15:
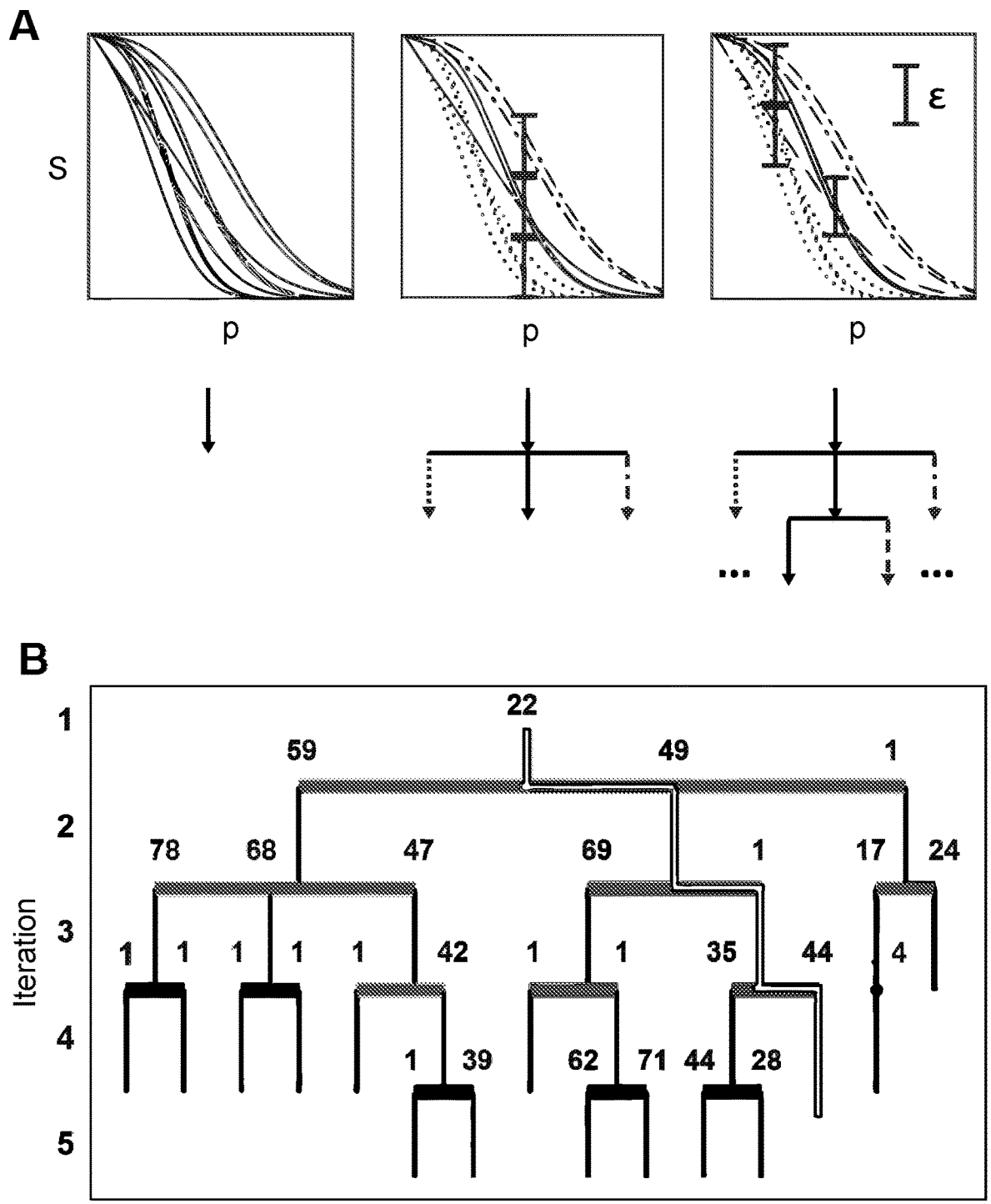
FIG. 15 illustrates an example of a diagram of an example of a method.

FIG. 15 shows an example of a method for construction and use of a multiclass regression tree 1500, which can be a DDM. FIG. 15 includes a series of plots and diagrams labeled (A) as a heuristic illustration of constructing a multiclass regression tree, which may be at a workstation, where decision nodes are in the same line types as the corresponding p—domain signals and ε is the instrument noise level; and a diagram labeled (B), which is an illustration of use of a regression tree in a simulation where, at each node, a bar underneath is the mean of two bounds of the interval attribute (e.g., $(b_{max}+b_{min})/2$), and the number is the parameter index in $\Pi_p$, from 1 to 100, at which the acquisition is taken. Below, a description of various examples of tree traversal are provided, which as mentioned, can include having the tree in a particular state, which may be utilized, for example, to automatically request an update to the tree.

As mentioned, a digital decision model (DDM) may be a tree or other type of decision structure that can be of a size suitable for loading and using in a constrained system (see, e.g., the system 1351 of FIG. 13).

As an example, a regression tree can be utilized as a surrogate for the aforementioned optimization procedure (e.g., making optimal decisions, selections, etc.). As an example, each node of a tree can corresponds to a Solution Ensemble; SE for the root is the initial $\Pi_q$, while SE for each leaf is a small subset of $\Pi_q$ that is bounded, for example, by instrument noise. For a parent node, SEs of its child nodes can be mutually exclusive, yet collectively constitute its SE. As an example, Solution Ensembles can be used for tree construction and not be stored in a tree. Such an approach can be implemented for reduction in size of a digital decision model (DDM) such that the DDM can be stored in memory of a system, which may be limited (e.g., not amenable to hardware upgrade, etc.). Such an approach can be utilized reducing the total size and computing loads when applying the method on an edge device as a constrained system.

As an example, in a tree, each node can be assigned two attributes: a measurement parameter and a numerical interval. As an example, an acquisition can be made at the parameter p where variance of the synthetic dataset, generated from the node's Solution Ensemble, maximizes per Equation 3 (above). In such an example, the acquired signal, S(p), falls within the numerical interval of one of the child nodes, which subsequently determines how the next acquisition will be performed. In such an example, the iterative procedure can be completed when a leaf is reached or when the acquired data lie outside of the prescribed decision range. Such conditions can be digital decision model (DDM) states, one state being a leaf state and the other state being a data state.

As an example, a method can include constructing a regression tree recursively. For example, to derive from a node to its child nodes, a method can include designating the parent node a measurement parameter $p_i$ and an interval $[b_{min,i}, b_{max,i}]$. In such an example, the interval constrains synthetic data sets, generated from Solution Ensemble of the node, $\Pi_{q,i}$, at $p_i$. Mathematically, $f(P_i,\tilde{q})\in[b_{min,i},b_{max,i}]$, $\forall \tilde{q} \in \Pi_{q,i}$.

As an example, a method can now partition the interval into $N_{bin}$ equally-spaced bins:

$$N_{bin} = \text{ceil}\left(\frac{b_{max,i} - b_{min,i}}{\varepsilon}\right), \quad (12)$$

where $\varepsilon$ is the amplitude of instrumental noise. From Equation 12, $N_{bin}$ child nodes of index j|i (j=1, 2, ... $N_{bin}$) are generated, each possessing an interval attribute $[b_{min,j|i}, b_{max,j|i}]$, where the two bounds are:

$$b_{min,j|i} = b_{min,i} + (j-1) \cdot \frac{b_{max,i} - b_{min,i}}{N_{bin}}, \quad (13)$$

$$b_{max,j|i} = b_{min,i} + j \cdot \frac{b_{max,i} - b_{min,i}}{N_{bin}}.$$

As in the parent node, the new interval corresponds to a Solution Ensemble, $\Pi_{q,j|i}$, that is a subset of $\Pi_{q,i}$. Meanwhile, the measurement parameter for node j|i is calculated by the following (see also, e.g., Equation 14):

$$p_{j|i} = \text{argmax } \sigma^2_{f(p,\tilde{q})} \quad (14)$$

$$p \in \Pi_p,$$

In FIG. 15, as mentioned, an example of a process for constructing a regression tree for the first three iterations is illustrated, where the first row are the synthetic data sets from Solution Ensembles of the corresponding decision nodes in the second row.

After a regression tree is constructed on one system (e.g., with more resources than another system), its attributes can be transmitted through a telemetry bus (e.g., wired and/or wireless) to memory of the other system, which may be RAM of an embedded microprocessor and/or accessible to the embedded processor. The attributes can define the regression tree, which can be a digital decision model (DDM). For example, a DDM may be defined by attributes where the attributes may be transmitted to effective effectively transmit the DDM (e.g., transmitting and/or receiving a DDM can be transmitting and/or receiving attributes that define the DDM). Once a DDM is loaded into a constrained system, the telemetry may be decoupled, placed in a low power operational state, set to a schedule, set in a listening mode, etc. In such an approach, operations of a workstation (see, e.g., the workstation system 1358 of FIG. 13) may be called upon in response to one or more actions, analyses, etc., which occur in or at the other system, which can perform, via the DDM, adaptive measurement based on decisions made locally using the DDM.

As an example, a sensor operation can commence at $p_0$, the parameter attribute of the root node. As the measurement advances, the next acquisition can be performed with measurement parameter $p_i$ of node i, and the acquired signal $S_i$ determines the child node that the digital decision model (DDM) will navigate to in operation.

As an example, a method can include traversal through tree nodes rigorously in a manner that reduce model uncertainty until reaching a decision leaf, where max $\sigma^2_{f(p,\tilde{q})} \leq \varepsilon^2$. FIG. 15 provides an example where the tree is built from a regression model $S = q_1 e^{-p/q_2}$ with $\varepsilon$ of 0.1. In such an example, the 2D property space $\Pi_q$ is constructed from 100 linearly spaced values of $\tilde{q}_1$ between 0 and 2, and 100 logarithmically spaced values of $\tilde{q}_2$ between 0.001 and 1. The measurement parameter space $\Pi_p$ includes 100 linearly spaced values between 0.001 and 5. Assuming that the true sample properties are $\{q_1, q_2\}_0 = \{0.8, 0.32\}$, the algorithm performs four acquisitions with parameters of $\{\Pi_p^{22}=1.0614, \Pi_p^{49}=2.4248, \Pi_p^{1}=0.001, \Pi_p^{44}=2.1723\}$, where the superscript indicates the index of the parameter within $\Pi_p$. The resulting property space of the final node resulted in the estimated sample properties of $\{0.75\pm0.08, 0.317\pm0.14\}$, which is consistent with the true properties.

On an edge device (e.g., edge system), memory demand for storing trees is 16 $N_{tree}$ bytes, where $N_{tree}$ is the total number of nodes (including leafs). As an example, each node may store four parameters: lexicographic order of node index $p_i$, $b_{min}$, and $b_{max}$, for example, with each parameter occupying 32 bits. In such an example, the memory demand for tree storage is 16 $N_{tree}$ bytes.

As an example, at node i, an algorithm can compute an absolute value of a difference between the acquired signal, $S_i$, and $(b_{min,j|i}+b_{max,j|i})/2$ of each child node, and navigate to the one that has the minimum difference. Consequently, the total number of floating point calculations can be a fraction of $N_{tree}$. In such an example, both computing load and memory cost for a regression tree can be substantially reduced.

As an example, a digital decision model (DDM) may be tailored to account for various conditions. For example, consider a condition where multiple properties q could result in a colossal multidimensional property space $\Pi_q$. Taking an example of 5 properties and each sampled at 100 points in double-precision format, $\Pi_q$ demands 80 GB ($100^5 \times 8$ bytes) disk space to store. Such a memory demand may result in reassessment of the DDM and operational performance of a system.

As another example, consider a condition with high sensor signal-to-noise ratio (SNR), combined with dense sampling points, which may lead to an oversized regression tree with respect to memory available.

Figure 16:
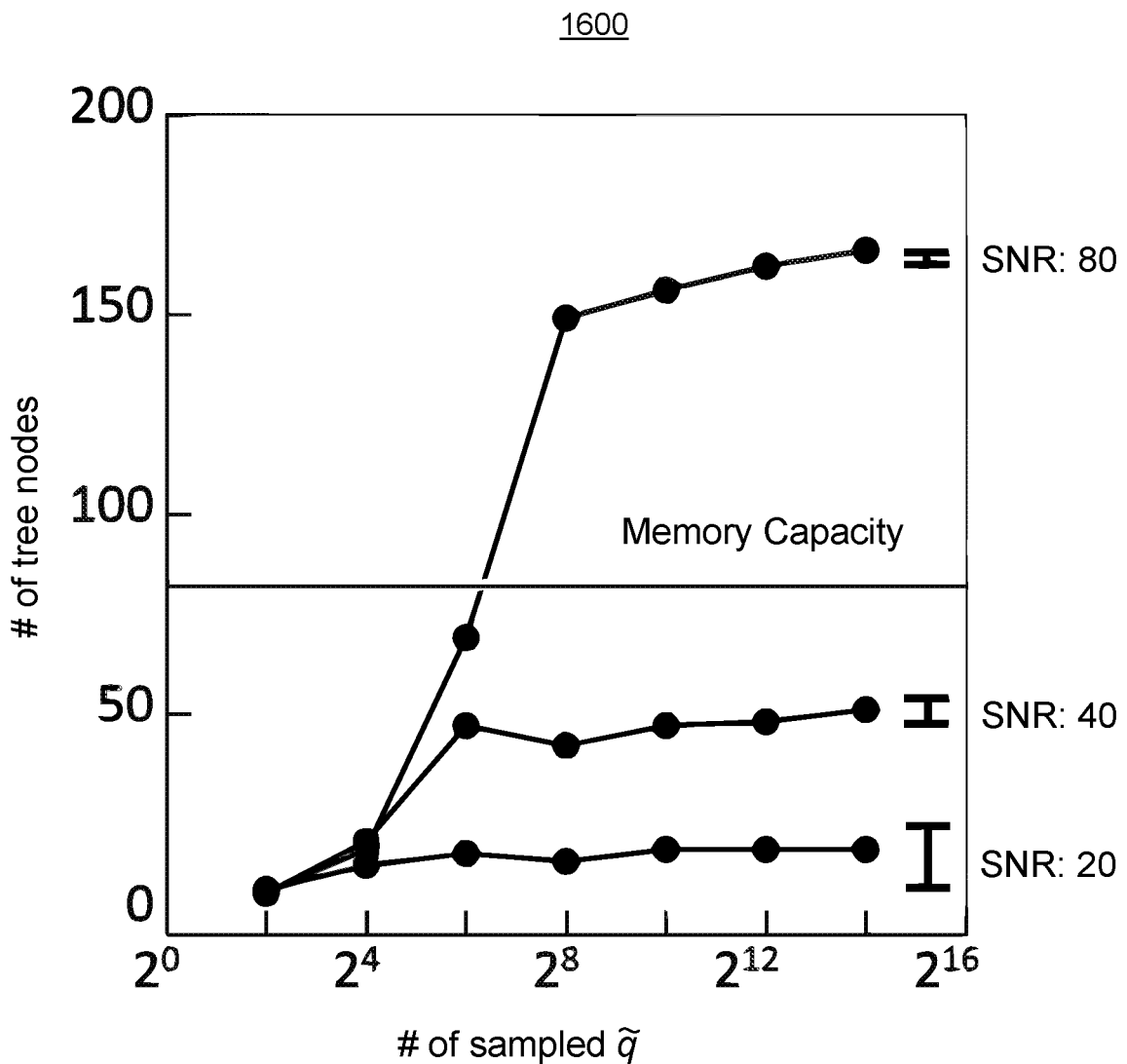
FIG. 16 illustrates an example of a plot.

FIG. 16 shows an example plot 1600 with a number of nodes versus sampling points of q, with a regression model of Equation 6 (above). As shown, at higher SNR (such as 80), denser sampling points are demanded to resolve minute differences of high-resolution data, which result in a large tree. While a system may have insufficient memory to store trees with more than 80 decision nodes, the system may be limited to perform an optimization routine under a certain SNR envelope.

Specifically, FIG. 16 shows the number of decision nodes as a function of the size of sampling space and instrument SNR, with the regression model of Equation 6. In the example of FIG. 16, the memory capacity of the microprocessor is taken to be that of the TMS320F28335 DELFINO MCU (Texas Instruments, Dallas Texas). The size of error bars is shown to be inversely proportional to the instrument SNR.

In various situations, guarantees on accuracy of prior knowledge about a sample may be limited. In the worst case, a prior belief may be wrong insofar that the initial sampling space, $\Pi_q$, does not contain the true sample properties.

As mentioned, a digital decision model (DDM) can be elastic where elasticity is provided in a heterogeneous computing architecture.

As mentioned, a method can include iteratively constructing updated (e.g., new, etc.) regression trees at a workstation while simultaneously considering acquired data, as well as the hardware limitations of an edge device (e.g., an edge system). As an example, a workstation can run different routines depending on whether a decision leaf was reached or not in a previous run.

As an example, a method such as the method 700 of FIG. 7 can include updating a digital decision model (DDM) according to one or more attributes of the DDM and/or the system in which the DDM is implemented. As mentioned, a DDM update may occur responsive to the DDM being in a particular state and/or a system being in a particular state (e.g., optionally with respect to its environment).

As an example, an attribute can be a zoom-in attribute, which may be implemented to zoom-in on a portion of a digital decision model (DDM), for example, to refine the DDM and update the DDM for transmission and use for further operations.

As an example, a reduced SNR, keeping other parameters fixed, can result in a smaller number of nodes $N_{tree}$, as shown in FIG. 16. As an example, an artificially elevated noise level, $\varepsilon_T > \varepsilon$, may be utilized for tree construction, so the tree in its entirety may be deployed to a constrained system.

The use of elevated $\varepsilon_T$ can lead to a low-resolution tree that resolves the sample properties q at a reduced level. After running the tree on the constrained system to a decision leaf (e.g., a state of the digital decision model (DDM)), the acquired data can be utilized, at least in part, to construct an updated tree with a progressively reduced $\varepsilon_T$. To keep the tree size under a memory limit, the size of the property space may also be decreased. Such a procedure can be repeated until $\varepsilon_T$ approaches $\varepsilon$. After each iteration, the envelop of the sampling space may be reduced while the density increases, thereby acting as a "zoom-in" attribute.

Figure 17:
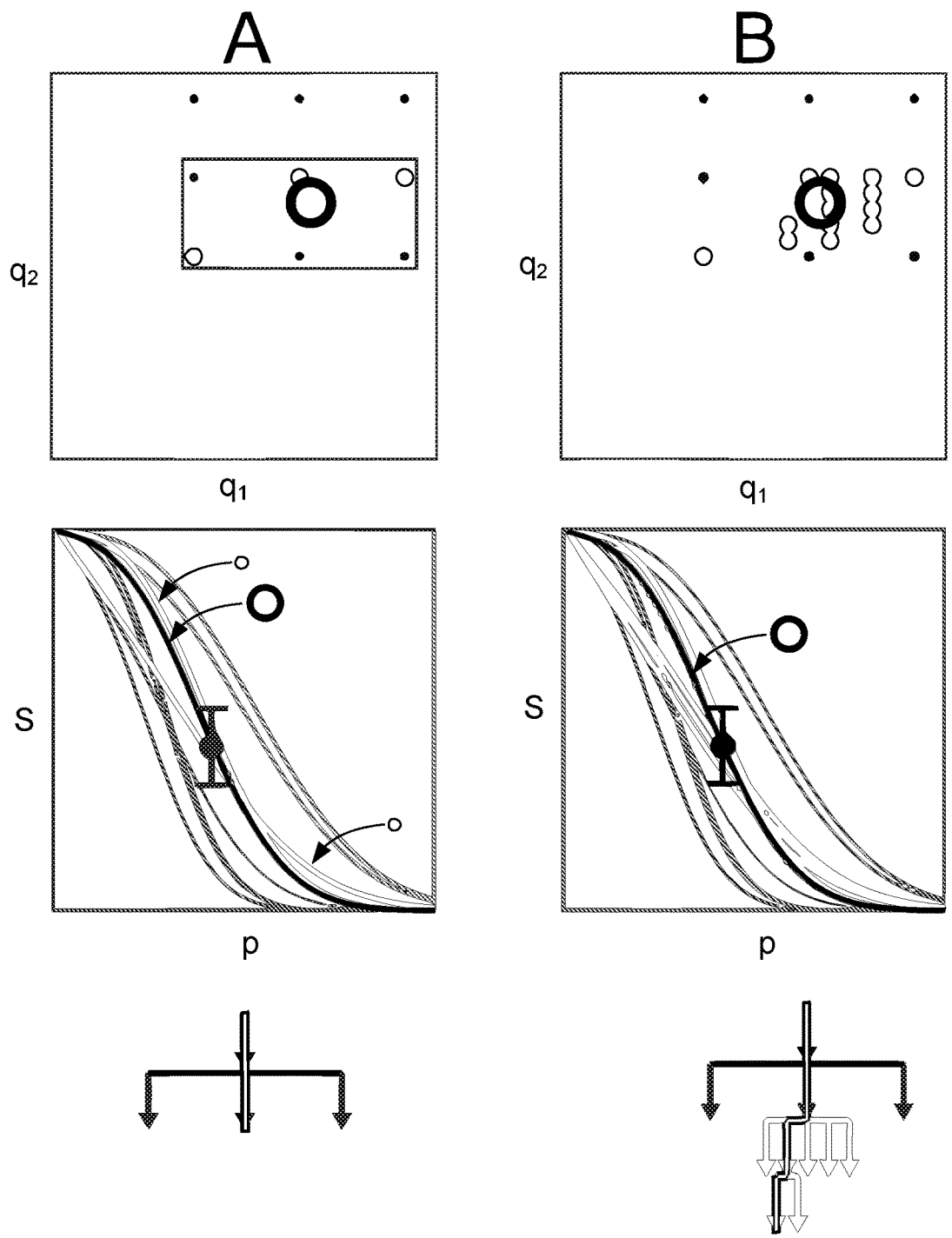
FIG. 17 illustrates example plots and an example of a diagram of an example of a method.

FIG. 17 shows an example of a diagram 1700 of a zoom-in attribute. The diagram 1700 shows a first row $\Pi_q$, with black dots as the original sampling points, other dots (e.g., circles) as the Solution Ensembles before (A) and after (B) a "zoom-in" operation; the second row show p-domain signals, with black traces from $\Pi_q$, II white filled traces from the respective Solution Ensembles, a thick black filled trace from the sample ground truth, and black dots are the acquired data; and the third row shows the first regression tree in A, the second "zoom-in" tree in B, and the traversal pathway in white with a thick black outline.

Specifically, FIG. 17 shows an example of a zoom-in attribute for a 2D sampling space, bounded by $(q_{1L}^0, q_{1U}^0)$ for $\tilde{q}_1$ and $(q_{2L}^0, q_{2U}^0)$ for $\tilde{q}_2$. The first tree, $tree_1$, was generated by $\varepsilon_{T,1}$ of tree size no larger than 80, the limit shown in FIG. 16. The first tree, $tree_1$, was loaded to the MCU and executed to a leaf, with $\{p_i, S_i\}(i=1, 2, \ldots)$ the acquisition parameters and corresponding data.

As an example, a zoom-in procedure can include:
1. Determining extremes of $\tilde{q}$ of the leaf, which in this example are $\{q_{1L}^1, q_{1U}^1\}$ for $q_1$ and $\{q_{2L}^1, q_{2U}^1\}$ for $q_2$;
2. Generating $n_0$ $\tilde{q}$'s uniformly in each dimension, bounded by the extremes so that $q_{1L}^1 \le \tilde{q}_1 \le q_{1U}^1$ and $q_{1L}^1 \le \tilde{q}_2 \le q_{2U}^1$;
3. Constructing a new property space $\Pi_{q,2}$ of $\tilde{q}$'s that satisfy the inequality: $(S_t - f(p_t, \tilde{q}))^2 \le \varepsilon^2 \forall i$.
4. Generating a second, updated tree, $tree_2$, with $\Pi_{q,2}$ and $\varepsilon_{T,2}$, where $\varepsilon_{T,2} \ge \varepsilon$ and $N_{tree,2} \le 80$.

As shown, the second, updated tree, $tree_2$, can be subsequently transmitted and loaded to memory of a constrained system. As an example, such a procedure may be repeated until $\varepsilon_T$ reaches $\varepsilon$.

As an example, when the leaf is a non-convex set, the uniform sampling in point 2 above can provide for generating a large number of $\tilde{q}$ that fails the test in point 3 above. As an example, to increase the number of qualified $\tilde{q}$, a method can include applying a convex hull to the leaf and its siblings (see, e.g., FIG. 24).

Figure 18:
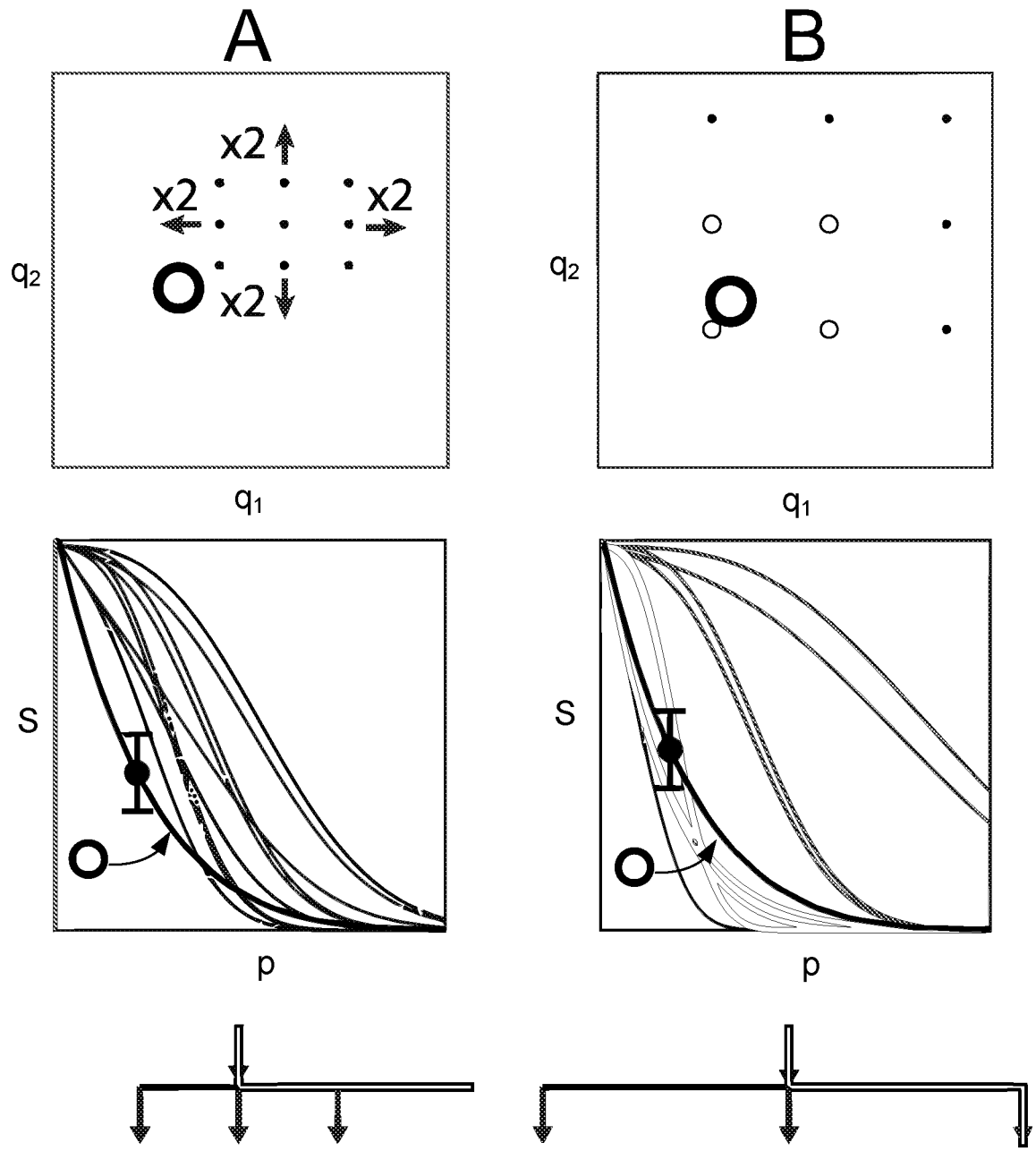
FIG. 18 illustrates example plots and an example of a diagram of an example of a method.

FIG. 18 shows an example of a diagram 1800 of a zoom-out attribute. In the example of FIG. 18, the diagram shows the first row representing $\Pi_q$, with black dots as the original sampling points, open circles as the Solution Ensemble after "zoom-out" in B, and the large open circle as the sample ground truth; the second row shows p—domain signals, with black traces from $\Pi_q$, white filled traces from the Solution Ensemble, the thick black filled trace from the sample ground truth, and each black dot being the acquired data; and the third row shows the first regression tree in A, the second "zoom-out" tree in B, and the acquisition pathway in being a white filled pathway with a thick black border.

As mentioned, a request to update a digital decision model (DDM) can occur responsive to a state of the DDM. For example, a state can be a failure of a tree to reach a leaf (e.g., to make a particular decision). In response to such a state, a request may be issued to instruct a workstation to make an attempt or attempts to expand the property space $\Pi_q$ with sparser sampling of $\tilde{q}$ over a wider space until it includes the ground truth.

As shown in FIG. 18, a method can expand the original FIG. $\Pi_q$ 2-fold along each of the dimensions at a time, until the constructed p-domain signals agree with acquired data points within the instrument noise margin. The diagram 1800 of FIG. 18 illustrates the zoom-out attribute in a 2D sampling space.

As mentioned, various methods may be utilized in a logging environment using one or more downhole tools. As an example, a multiclass regression tree and its elastic attributes can be utilized to instruct a downhole tool to perform NMR measurements.

An NMR measurement may be carried out by a time sequence of transmission and acquisition events. The measurement results, S, may be interpreted by nonlinear regression models with inputs of the measurement parameters, p. Sample properties, q, such as diffusion coefficient, relaxation times, and chemical shift of molecules, may be obtained by various inversion methods.

As an example, a method can be implemented to dynamically optimize the NMR measurements, given computational constraints of NMR equipment (e.g., an NMR system). In such an example, optimization can be guided by a regression tree constructed a priori, and newly acquired signals S.

In various examples, NMR measurements are simulated, for example, using a software stack, written in the C programming language for an embedded system and in MATLAB for a workstation. The embedded system included a TMS320F28335 DELFINO MCU (Texas Instruments, Dallas, Texas) with 68 KB RAM and 150 MHz CPU speed as the embedded chipset while the workstation was a PC with 48 GB RAM and an INTEL XEON E5 CPU (3.6 GHz). The two computing units were connected by a USB cable through a RS-485 serial communication. In each experiment, simulated data, generated from a sample ground truth, were synthesized at the workstation and loaded to the MCU RAM. The regression tree, also operated at the MCU RAM, queries the synthetic data at a sequence of measurement parameters, and returns the acquired points and an exit flag upon completing the iterative procedure.

In particular, a class of NMR experiments were simulated as find use in remote sensing applications, with the following regression model:

$$S = e^{-p/T_2} e^{-A\rho^3 \cdot D} + \varepsilon, \quad (15)$$

where p is the measurement parameter in a time interval. T2 (relaxation time) and D (molecular diffusion coefficient or Dc) are the two sample properties of interest. A is a calibration constant, which was set to unity and that may be utilized where desired by setting it to a different value. Both sample properties take a wide numerical range as in encountered samples. For example, it was reported that $T_2$ may vary from $10^{-3}$ to a few seconds and D from $10^{-6}$ to $10^{-4}$ cm$^2$/s.

The properties $\{T_2, D\}$ may be estimated by measuring S for each value of p in $\Pi_p$ and subsequently applying inversion routines to the acquired data set $\{S(\Pi_p)\}$. In contrast, an example method determined $\{T_2, D\}$ with a small number of acquisitions using values $\{p_i\}$ that are dynamically adjusted for each individual sample.

Table 2, below, provides a summary of results for the simulated NMR experiments.

| No. | $\{T_2, D \times 10^5\}_0$ | SNR | $p_i \times 10^2$ | $\{T_2, D \times 10^5\}$ |
|---|---|---|---|---|
| 1 | {0.5, 1} | 40 | {6.38, 3.2, 7.43} | {1.7 ± 1.3, 1.1 ± 0.2} |
| 2 | {0.3, 1} | 100 | {6.38, 3.2, 7.59, 3.35} | {0.31 ± 0.05, 1.00 ± 0.08} |
| 3 | {0.04, 0.2} | 40 | {6.38, 2.89, 3.2} | {0.040 ± 0.003, 0.39 ± 0.27} |

For the three experiments, labeled 1, 2 and 3, for different instrument noise characteristics and sample properties, $\Pi_p$ was a fixed 1D array of 100 linearly spaced time intervals from $2 \times 10^{-4}$ s to $1.5 \times 10^{-1}$ s, from which the simulated data, $\{S(p_i)\}$, were generated. The initial sampling space for the sample properties, $\Pi_{q,1}$, was constructed from 100 logarithmically spaced relaxation times $\tilde{T}_2$ from 0.1 s to 3 s and 100 logarithmically spaced diffusion coefficients $\tilde{D}$ from $0.4 \times 10^{-5}$ to $3 \times 10^{-5}$ cm$^2$/s. In total, $\Pi_{q,1}$ included $10^4$ $\{\tilde{T}_2, \tilde{D}\}$ pairs.

In the first experiment, the sample ground truth was set at $\{T_2, D\}_0 = \{0.5 \text{ s}, 1 \times 10^{-5} \text{ cm}^2/\text{s}\}$ and a normally distributed instrument noise of amplitude $\varepsilon = 0.025$ and variance 1. At the workstation, a 51-node regression tree was constructed with tree noise $\varepsilon_T = \varepsilon$ and the regression model of Equation 6. Since the number of nodes was under the MCU limit, the tree was loaded into the MCU RAM.

Figure 19:
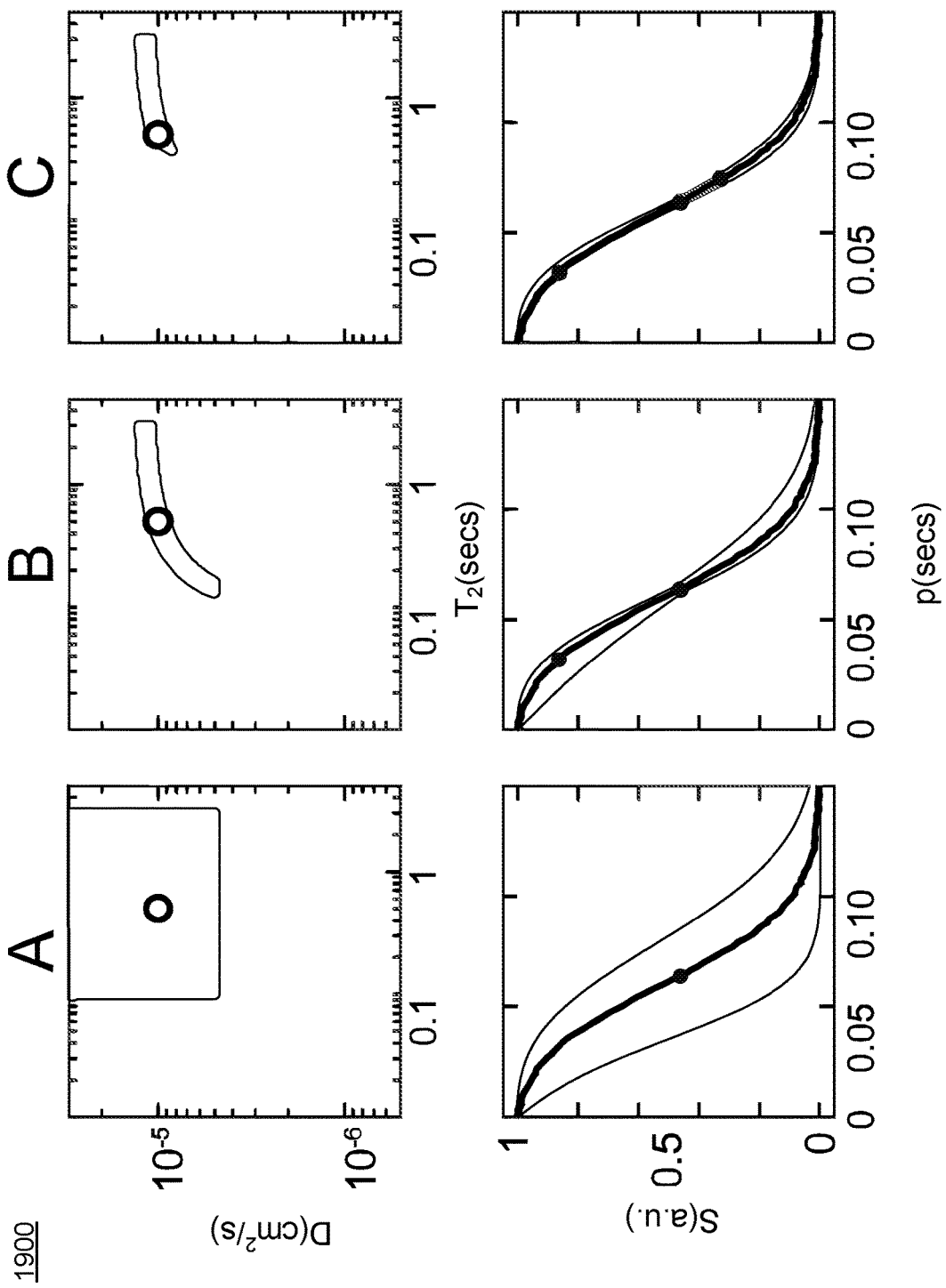
FIG. 19 illustrates example plots of an example of a method.
Figure 20:
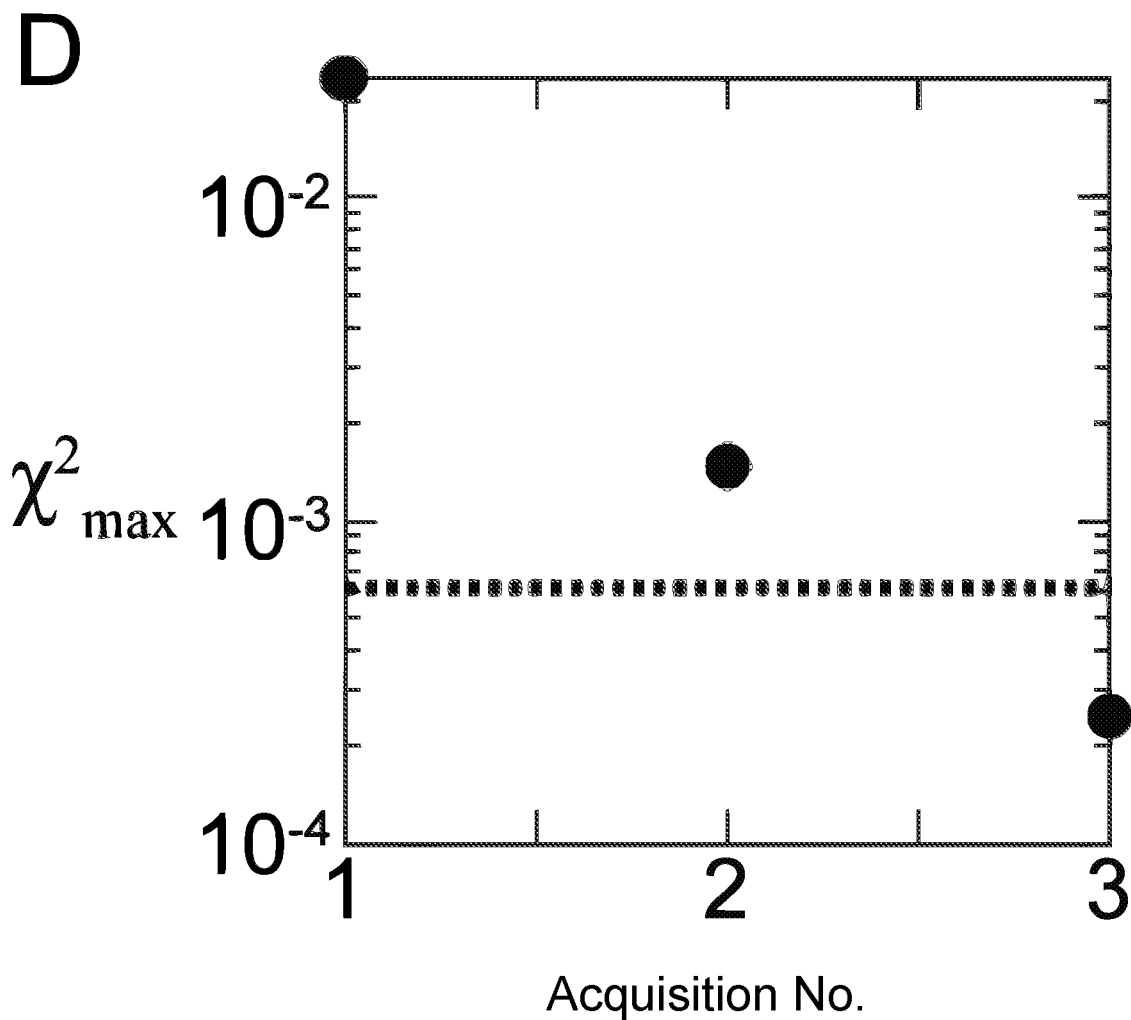
FIG. 20 illustrates an example plot of an example of a method.
Figure 21:
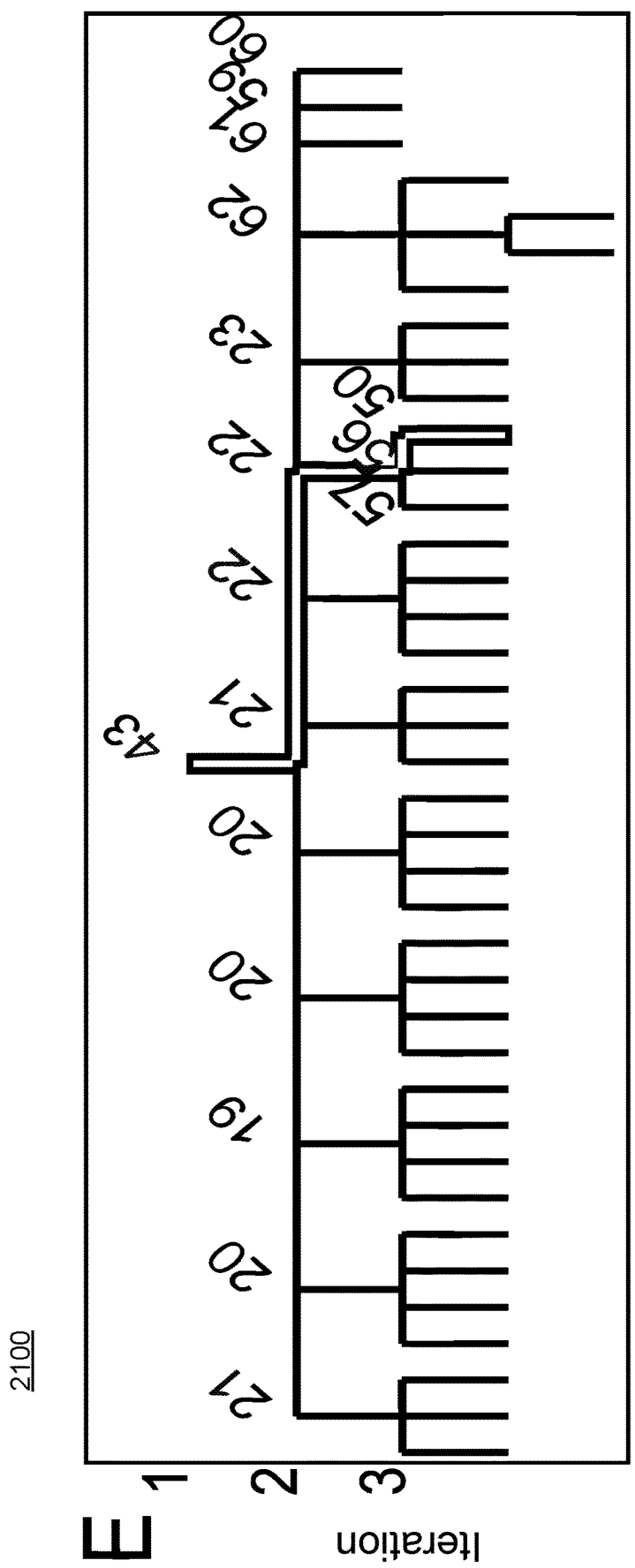
FIG. 21 illustrates an example diagram of an example of a method.

FIGS. 19, 20 and 21 show an example of running a regression tree in a simulated NMR experiment where the regression tree is an example of a digital decision model (DDM). In FIG. 19, a series of plots 1900 are shown; in FIG. 20, a plot 2000 is shown; and in FIG. 21, the regression tree 2100 is shown.

In FIG. 19, the series of plots 1900 are for A, B and C, which are three iterations of realtime optimization on data acquisition. In the first row, open regions about an open circle are the Solution Ensembles after the previous acquisition, and the open circle indicates the sample ground truth.

In the second row, the black traces show constructed $\tilde{S}$'s from their respective Solution Ensembles, and black dots are the acquired data. In FIG. 20, the plot 2000, labeled "D" shows the maximum variance of the Solution Ensembles over three acquisitions, with the dashed line being the instrument noise floor (e.g., for an acquisition system such as the system 1351 of FIG. 13). In FIG. 21, the regression tree 2100, labeled "E" shows the regression tree 2100 as a 51-node tree, which is used in the experiment, where, for example, each bar can be coded, for example, with bounds, etc. For example, a bar can be positioned underneath each node that represents the mean of two bounds of its interval attribute and, for example, the number can be the parameter index in Π at which the acquisition is taken.

As shown in the series of plots 1900, for A, B and C, the optimization routine traversed through the regression tree 2100 to a leaf, corresponding to a Solution Ensemble that contained the ground truth $\{T_2, D\}_0$. As the tree was made with the instrument $\varepsilon$, reaching the leaf indicated that $\chi_{max}^2$ of the synthetic p—domain data fell below $\varepsilon^2$, as shown in the plot 2000 of FIG. 20 (see "D"). Also shown in FIG. 21 is the acquisition pathway through the regression tree 2100 (see "E"), with measurements taken at $\{\Pi_p^{43} = 0.0638, \Pi_p^{22} = 0.032, \Pi_p^{55} = 0.0743\}$.

In the second experiment, the sample ground truth was $\{T_2, D\}_0 = \{0.3 \text{ s}, 1 \times 10^{-5} \text{ cm}^2/\text{s}\}$ and a normally distributed noise of amplitude $\varepsilon = 0.01$. The regression tree, built with instrument noise $\varepsilon$, resulted in $N_{tree} = 239$ that was too large to load to the particular MCU (e.g., the memory limit of the acquisition system was insufficient to load the digital decision model (DDM)). In such a situation, a smaller tree can be constructed (e.g., a smaller sized DDM), for example, with $\varepsilon_{T,1} = 0.025$ was constructed with $N_{tree} = 80$. This tree$_1$ on the MCU made 3 queries before reaching a decision leaf, returning the acquired data with an exit flag (e.g., as to a terminal state or leaf state) that requested a zoom-in operation at the workstation.

Figure 22:
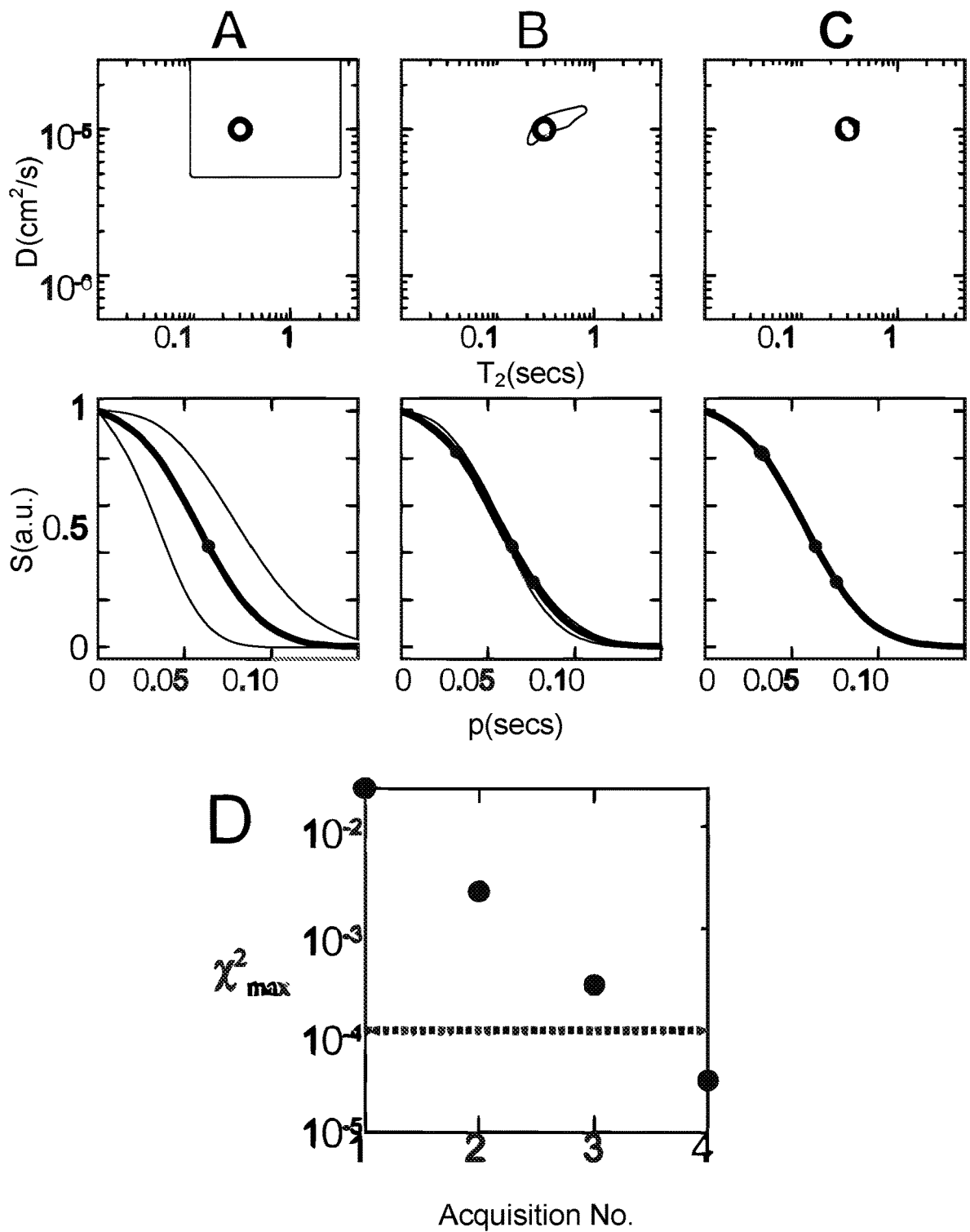
FIG. 22 illustrates example plots of an example of a method.

FIG. 22 shows an example of a series of plots 2000 for an example of a zoom-in process in a simulated NMR experiment. In FIGS. 22, A, B and C represent the iterations of real-time optimization on data acquisition. In the first row, the outlined regions represent the Solution Ensembles before (A), after three (B), and four (C) acquisitions, and the open circle is the sample ground truth. In the second row, black traces are constructed $\tilde{S}$'s from their respective Solution Ensembles, and black dots represent acquired data. In FIG. 22, the plot labeled D shows the maximum variance of Solution Ensembles over 4 acquisitions, with the dashed line being the instrument noise floor.

Subsequently, a second tree was constructed at the workstation, constrained by $\{p_i, S(p_i)\}$ with $\varepsilon_T = \varepsilon$. The tree$_2$ of 1 node was loaded to the MCU, making one query as shown in the diagram of FIG. 22 (see "C").

In the third experiment, instrument noise amplitude was set at 0.025 and the sample ground truth was set at $\{T_2, D\}_0 = \{0.04 \text{ s}, 0.2 \times 10^{-5} \text{ cm}^2/\text{s}\}$. As $\{T_2, D\}_0$ lay outside the property space $\Pi_{q,1}$, tree$_1$ with $\varepsilon_{T,1} = 0.025$ failed to reach a leaf. It made two queries and returned the acquired data and an exit flag instructing a zoom-out operation.

Figure 23:
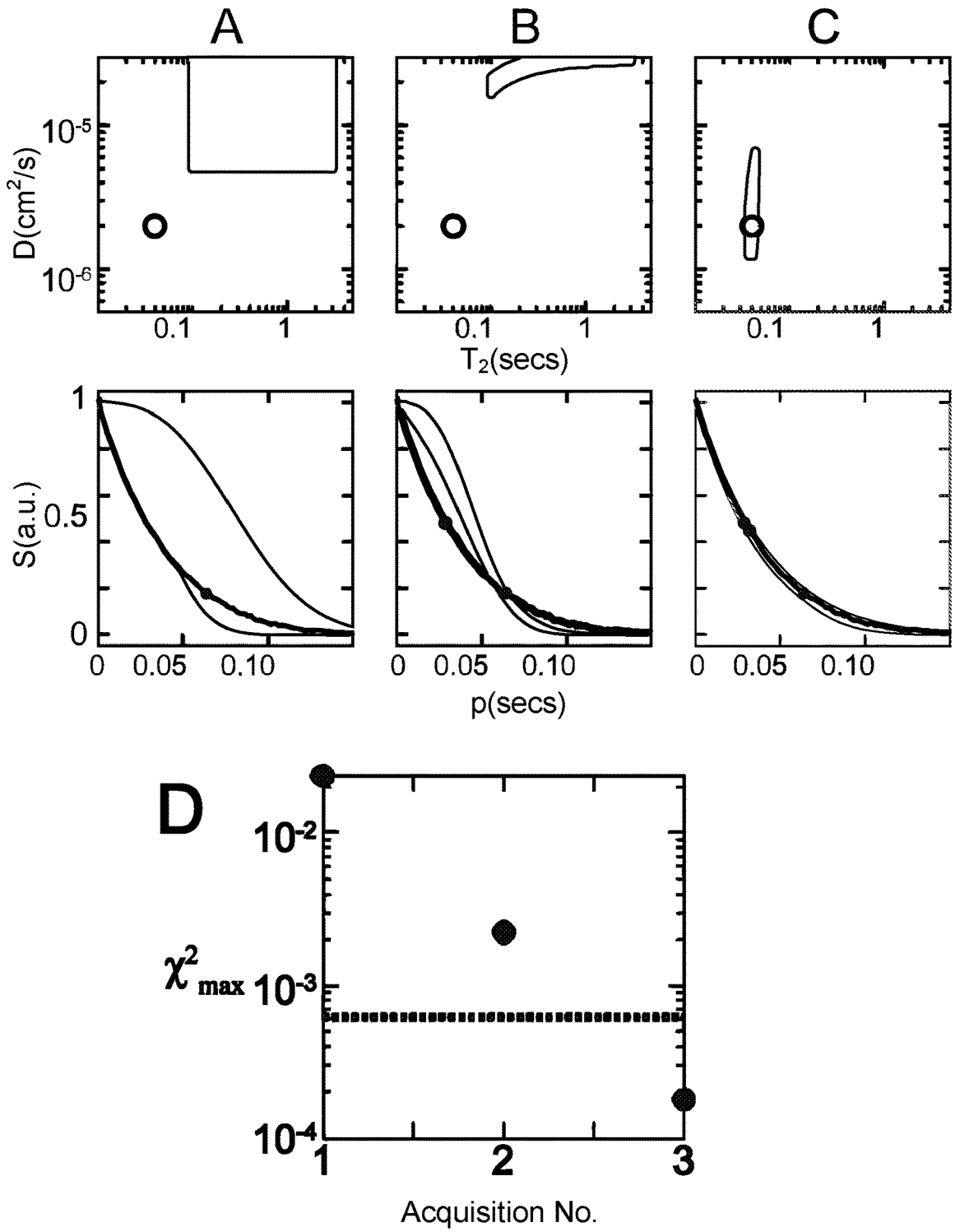
FIG. 23 illustrates example plots of an example of a method.

FIG. 23 shows an example of a series of plots 2300 of an example of a zoom-out process in a simulated NMR experiment. As shown in FIGS. 23, A, B and C are the three iterations of realtime optimization on data acquisition. In the first row, the outlined regions are the Solution Ensembles after the previous acquisition, and the open circle is the sample ground truth. In the second row, black traces are constructed S's from their respective Solution Ensembles, and black dots represent the acquired data. In FIG. 23, the plot labeled D shows the maximum variance of SE over three acquisitions, with the dashed line being the instrument noise floor.

Subsequently, a sparser yet wider sampling space, $\Pi_{q,2}$, was constructed with 100 logarithmically spaced $\tilde{T}_2$ from 0.025 s to 12 s and 100 logarithmically spaced $\tilde{D}$ from $0.1 \times 10^{-5}$ to $1.2 \times 10^{-4}$ cm$^2$/s. The new sampling space was further tested to ensure that both $\{p_1, S_1\}$ and $\{p_2, S_2\}$ were consistent within its envelope. Keeping $\varepsilon_{T,2}$ unchanged at 0.025, the tree$_2$ of 1 node was executed, yielding one more acquisition point. With two regression trees and three queries, the optimization workflow found the true sample property, permitted by the instrument noise limit as shown in the plot labeled D in FIG. 23.

In the three examples, the workflow started from acquiring at the root node, and managed to dynamically optimize data acquisitions with different sample properties and instrument noise. In each experiment, the variance of the last Solution Ensemble reflects sensitivities of each physical property to both the nonlinear model and the instrument noise, as shown in the fifth column of Table 2.

Remote sensing systems tend to perform sensing operations according to prescribed protocols and at times demand professional interventions. As an example, a method such as the method 700 of FIG. 7 can provide elasticity in that, in a constrained system, updates can occur dynamically to a digital decision model (DDM) for making decisions as to how one or more sensing operations are performed. As an example, a system may be configured as the system 1350 of FIG. 13 where flags may be utilized to request dynamic updates to one or more digital decision models (DDMs) that can be loaded in memory.

As shown as an example, an algorithm can be utilized for NMR measurements where, for example, singular points in $\Pi_q$ can be sample ground truths. As an example, advanced measurements on complex samples may include both mathematically sophisticated models and continuous distributions of multiple physical quantities.

As explained, a method can include quantifying model uncertainty where making of observations and/or decisions falls within an envelope of a Bayesian network.

As an example, a method may be applied to one or more sensors of a parametric model. As an example, a method may be applied to optimize performance of one or more sensor arrays of nonparametric and/or hybrid models. As an example, one or more workflows may be automated, coordinated and quantifiable for measurements in a heterogeneous computing environment.

FIG. 24 shows examples of pseudocode algorithms 2410 and 2430 for examples of methods for a zoom-in attribute for 2D sampling space with non-convex sets.

As an example, a convex hull of a set of points in 2D space can be a polygon with a minimal area that includes the whole set. As an example, an algorithm can apply qHull to generate a convex hull of a set of vectors and inHull to decide if a given vector is in or out of a convex hull. For inHull, as an example, consider a MATLAB script developed by J. D'Errico (10226-inhull).

As an example, a zoom-in procedure can aim to increase the density of sampling points, as qualified, of a reached decision leaf. In such an example, an approach can propose likely qualified q̃'s in an efficient manner. Denoting L the set of q̃'s of the leaf, a strategy is to increase sampling points within the envelop of L that contains the sample ground truth. Determining the envelop of L can be nontrivial when it is a non-convex set.

In FIG. 24, the example algorithm 2410 is shown as being executable to determine the envelope of L (represented as acceptedQSet). In the algorithm, it is denoted $S_i$(i=1, 2, . . . ) as the q̃ sets for the leaf's siblings and generate $n_Q$ q̃'s, qCandidate, from L. The algorithm 2410 then calculates the convex hull of L, acceptedCH, and subsequently accepts a subset of qCandidate that is within acceptedCH. To further reduce non-qualified sampling points in qCandidate, an approach can include calculating the convex hull of each $S_i$ and excluding sampling points in the remaining qCandidate that fall within rejectedCH$_i$, but not within L. In such an approach a final qCandidate can be used.

As an example, one or more issues may arise when deriving the convex hulls. For example, the number of q̃'s in L can be small, and sometimes fall onto one line, such as when L has 1 or 2 q̃'s. In those cases, the convex hull can be ill-defined. In other cases, due to the discrete nature of sampling points the convex hull of L may include several non-overlapping polygons. If the ground truth lies in one of the in-between gaps, it can be missed in the initial qCandidate.

As an example, a method can include expanding L so that a properly defined, continuous convex hull can be derived. The example algorithm 2430 in FIG. 24 shows such an approach with nDim=2. Once expanded, the new L can be subsequently used as an input for convex hull sampling.

As an example, a method can include performing an operation using a system where the operation depends on a decision made via a digital decision model stored in memory of the system; responsive to a decision state of the digital decision model, transmitting a request to update the digital decision model; and, responsive to the request, receiving an updated digital decision model, where the updated digital decision model includes at least one new decision state that improves performance of the operation of the system. In such an example, the method can be performed while the system is moving (e.g., consider a downhole tool being conveyed in a borehole). As an example, a digital decision model can be or include a regression tree model. As an example, a digital decision model may be defined by attributes such that transmission, reception, etc., of the attributes effectively transmits, receives the digital decision model.

As an example, a digital decision model can depend on one or more specifications of one or more sensors of a system. As an example, an operation can be a sensing operation and, for example, a digital decision model can depend on signal to noise of the sensing operation.

As an example, a method can include a system that is moving in an environment, where the system performs a sensing operation that acquires sensor measurements of samples in the environment while the system is moving. In such an example, the system may navigate a digital decision model (DDM) while the system is moving. In such an example, where the environment changes, the DDM may be navigated to result in use of operational parameters that improve performance of the system (e.g., to tailor the system to changes in the environment). As an example, a digital decision model can depend on a signal to noise ratio of a sensing operation of a system where the signal to noise ratio changes responsive to physical changes in an environment that occur responsive to the system moving in the environment. In such an example, an improvement in signal to noise ratio for a particular environment may be an improvement to performance of the system.

As an example, a system can be a downhole system for deployment in a borehole in a geologic environment and an operation can be a nuclear magnetic resonance measurement operation that measures nuclear magnetic resonance signals of an in situ sample in the geologic environment. For example, a method can include performing an NMR measurement operation using a downhole system (e.g., a NMR tool, etc.) where the operation depends on a decision made via a digital decision model stored in memory of the downhole system; responsive to a decision state of the digital decision model, transmitting a request to update the digital decision model (e.g., to a surface system at least in part via downhole to surface telemetry); and, responsive to the request, receiving an updated digital decision model by the downhole system, where the updated digital decision model includes at least one new decision state that improves performance of the NMR measurement operation of the downhole system.

As an example, a decision state can be a terminal state of a digital decision model. For example, consider a tree with leafs where each leaf can be a terminal state. As an example, a DDM can include nodes where one or more nodes can be a terminal state node.

As an example, decision states can include one or more non-terminal states of a digital decision model. As an example, a non-terminal state may be a state that exists after a number of iterations where, for example, a terminal state is not reached.

As an example, a method can include selecting, based on a decision state of a digital decision model stored in memory, a flag from a plurality of different flags stored in the memory, where a request for an updated digital decision model corresponds to the selected flag, where the decision state is a terminal state of the digital decision model, and where at least one new decision state of the updated digital decision model is a decision state that extends from the terminal state. As an example, such a method may be referred to as a zoom-in model, which may refine one or more parameters for operation of a system. As shown in FIG. 17, an updated digital decision model can include one or more additional states (e.g., leaves, etc.) that extend from a terminal state (e.g., a terminal leaf) of the digital decision model that gave rise to a request for the updated digital decision model. As an example, a system can include at least one of a plurality of different flags stored in memory that is selectable for a non-terminal state of a digital decision model. For example, consider a flag that is for a zoom-out operation where an example is shown in FIG. 18 where a level with leaves is extended to include an additional leaf that is at the same level as the leaves. Such an approach may be utilized where iterative use of the digital decision model does not cause the digital decision model to arrive at a terminal state (e.g., a terminal leaf, etc.). While two types of decision states and corresponding flags are mentioned, a system can include one or more other decision states and one or more other corresponding flags. As mentioned, an elastic approach may be utilized for parameters such as power parameters, signal to noise parameters, etc. In such examples, various decision states can exist with corresponding flags that can call for (e.g., request) an update or updates to one or more digital decision models.

As an example, a method can include performing an operation using a system where the operation depends on a decision made via a digital decision model stored in memory of the system; responsive to a decision state of the digital decision model, transmitting a request to update the digital decision model; and, responsive to the request, receiving an updated digital decision model, where the updated digital decision model includes at least one new decision state that improves performance of the operation of the system. As an example, in such a method, responsive to use of the updated digital decision model, it may be determined (e.g., locally and/or remotely) that the updated digital decision model is sufficient in that it provides for desirable operation. In such an example, the determination may cause one or more actions of the system to be suspended, which may preserve power, free memory, etc. In such an example, the updated digital decision model may be in a decision state that may be a terminal state, for example, with corresponding operational parameters, where the system continues to operate according to those operational parameters. In such an approach, one or more conditions, which may be or include one or more conditions other than a decision state condition, may trigger an assessment that may result in a call for another updated digital decision model. For example, consider a downhole tool that is conveyed along a length of a borehole where a change in temperature may trigger such an assessment, reaching a particular depth (e.g., vertical or measured) may trigger such an assessment, etc.

As an example, an operation can be a sensing operation and a decision state can depend on a measurement value acquired by the sensing operation. As an example, the measurement value may be characterized by a signal to noise ratio where the decision state may depend at least in part on the signal to noise ratio. As an example, a signal to noise ratio may depend on one or more factors, which can include signal acquisition programmable factors, environmental factors and/or equipment factors (e.g., instrument factors).

As an example, a method can include performing an operation utilizing at least one new decision state of an updated DDM. For example, a DDM may be limited in its number of decision states in that the decision states do not provide for optimal operation of equipment. In such an example, a new DDM can include one or more new decision states that allow for more optimal operation of the equipment.

As mentioned, as an example, a database may be accessible via a constrained system where the database includes a plurality of DDMs where one of the DDM may be selected and transmitted to the constrained system where once received the DDM may be implemented to make decisions as to how the constrained system is operated.

As an example, a system can be a downhole system that performs operations that include a downhole sensing operation and where the downhole system can transmit a request to a surface system. In such an example, the downhole system and the surface system can be a heterogeneous system. As an example, the surface system can transmit an updated digital decision model and the downhole system can receive the transmitted updated digital decision model as transmitted by the surface system. In such an example, the downhole system can receive via utilizing a downhole telemetry technique, which may be wired, wireless, etc. As an example, a downhole telemetry technique can include a mud-pulse telemetry technique where pulses are made that travel through mud as a drilling fluid (e.g., drilling mud).

As an example, a method can include restricting an updated digital decision model to a size that depends on memory of a constrained system. In such an example, a method can include restricting that includes adjusting the size of an updated digital decision model based on, for example, a signal to noise ratio of signals acquired by performing signal acquisition operations by the constrained system.

As an example, a decision state of a digital decision model can result in a request for a zoom-in process that adds at least one node/leaf to a terminal node/leaf of the digital decision model. As an example, a decision state of a digital decision model can result in a request for a zoom-out process that adds at least one branch to a layer of the digital decision model.

As an example, a system can be an implantable medical system and an operation thereof can be or include a therapeutic operation.

As an example, a system can be a remote sensing system and an operation thereof can be or include a sensing operation.

As an example, a system can be an embedded system that is embedded in a structural body and an operation thereof can include a sensing operation that senses at least one physical property of the structural body (e.g., stress, strain, chemical environment, vibration, moisture, etc.).

As an example, a system can include a downhole tool and an uphole system with more computing facility than the downhole tool, where a digital decision model (DDM) is stored in memory of the downhole tool, and the execution of the DDM is performed in the downhole tool, and where updating of the digital decision model is performed at the uphole system. For example, the downhole tool can transmit one or more of data, flags, etc., to the uphole system and, in response, the uphole system can generate and transmit an updated digital decision model (DDM) to the downhole system. Such a method may occur iteratively, for example, as the downhole tool moves and experiences one or more changes in conditions, which may be, for example, changes that the downhole tool aims to characterize via measurements (e.g., sensor measurements). As an example, an environment can be stratified where, geologically, it may be characterized via stratigraphy. As an example, a downhole tool can be conveyed in a borehole to make sensor measurements that can help in characterization of the environment, which may include measurements that can improve characterization via stratigraphy (e.g., lithostratigraphy (lithologic stratigraphy) and/or biostratigraphy (biologic stratigraphy)).

As an example, a system can be an embedded system tool. For example, the tool can be transportable and optionally powered by its own internal power supply and/or a transportable power generator (e.g., turbine, solar, etc.). As an example, an embedded system tool can include telemetry circuitry that can communicate with another system such as a high-performance computing system (HPC system), which may be, for example, a workstation type of computing system. In such an example, a digital decision model can be stored in memory of the embedded system tool where execution of the decision model is performed in the embedded system tool where updating of the digital decision model is performed by the HPC system, which can, via telemetry, transmit the updated digital decision model to the embedded system tool. In such an example, the embedded system tool can be a downhole tool that has less memory than the HPC system, which can be a surface system (e.g., an uphole system).

As an example, a system can include a downhole tool and an uphole system with more computing facility that the downhole system where a digital decision model (DDM) is transmitted from the uphole system to the downhole tool, which may occur periodically, for example, with one or more updated DDMs to improve performance of the downhole tool.

As an example, a system can include a processor; memory accessible to the processor; processor-executable instructions stored in the memory and executable by the processor to instruct the system to: perform an operation using the system where the operation depends on a decision made via a digital decision model stored in the memory of the system; responsive to a decision state of the digital decision model, transmit a request to update the digital decision model; and, responsive to the request, receive an updated digital decision model, where the updated digital decision model includes at least one new decision state that improves performance of the operation of the system.

As an example, one or more computer-readable storage media can include processor-executable instructions executable to instruct a processor to: call for performance of an operation using a system where the operation depends on a decision made via a digital decision model stored in memory of the system; responsive to a decision state of the digital decision model, call for transmission of a request to update the digital decision model; and, responsive to the request, call for storage in the memory of a received updated digital decision model, where the updated digital decision model includes at least one new decision state that improves performance of the operation of the system.

Figure 25:
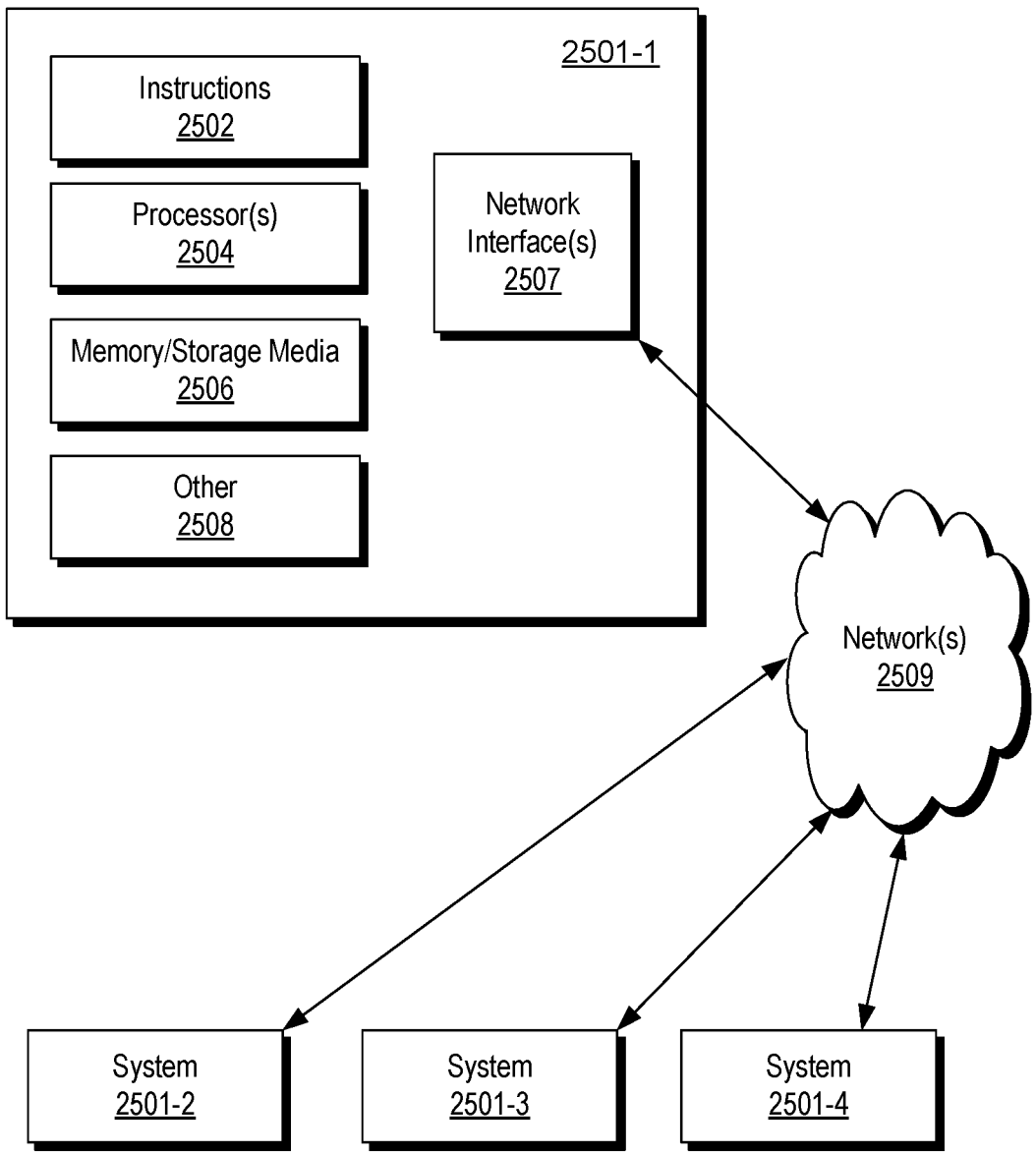
FIG. 25 illustrates examples of computing and networking equipment.

In some embodiments, a method or methods may be executed by a computing system. FIG. 25 shows an example of a system 2500 that can include one or more computing systems 2501-1, 2501-2, 2501-3 and 2501-4, which may be operatively coupled via one or more networks 2509, which may include wired and/or wireless networks.

As an example, a system can include an individual computer system or an arrangement of distributed computer systems. In the example of FIG. 25, the computer system 2501-1 can include one or more sets of instructions 2502, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 2504, which is (or are) operatively coupled to one or more storage media 2506 (e.g., via wire, wirelessly, etc.). As an example, one or more of the one or more processors 2504 can be operatively coupled to at least one of one or more network interface 2507. In such an example, the computer system 2501-1 can transmit and/or receive information, for example, via the one or more networks 2509 (e.g., consider one or more of the Internet, a private network, a cellular network, a satellite network, etc.).

As an example, the computer system 2501-1 may receive from and/or transmit information to one or more other devices, which may be or include, for example, one or more of the computer systems 2501-2, etc. A device may be located in a physical location that differs from that of the computer system 2501-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 2506 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 26:
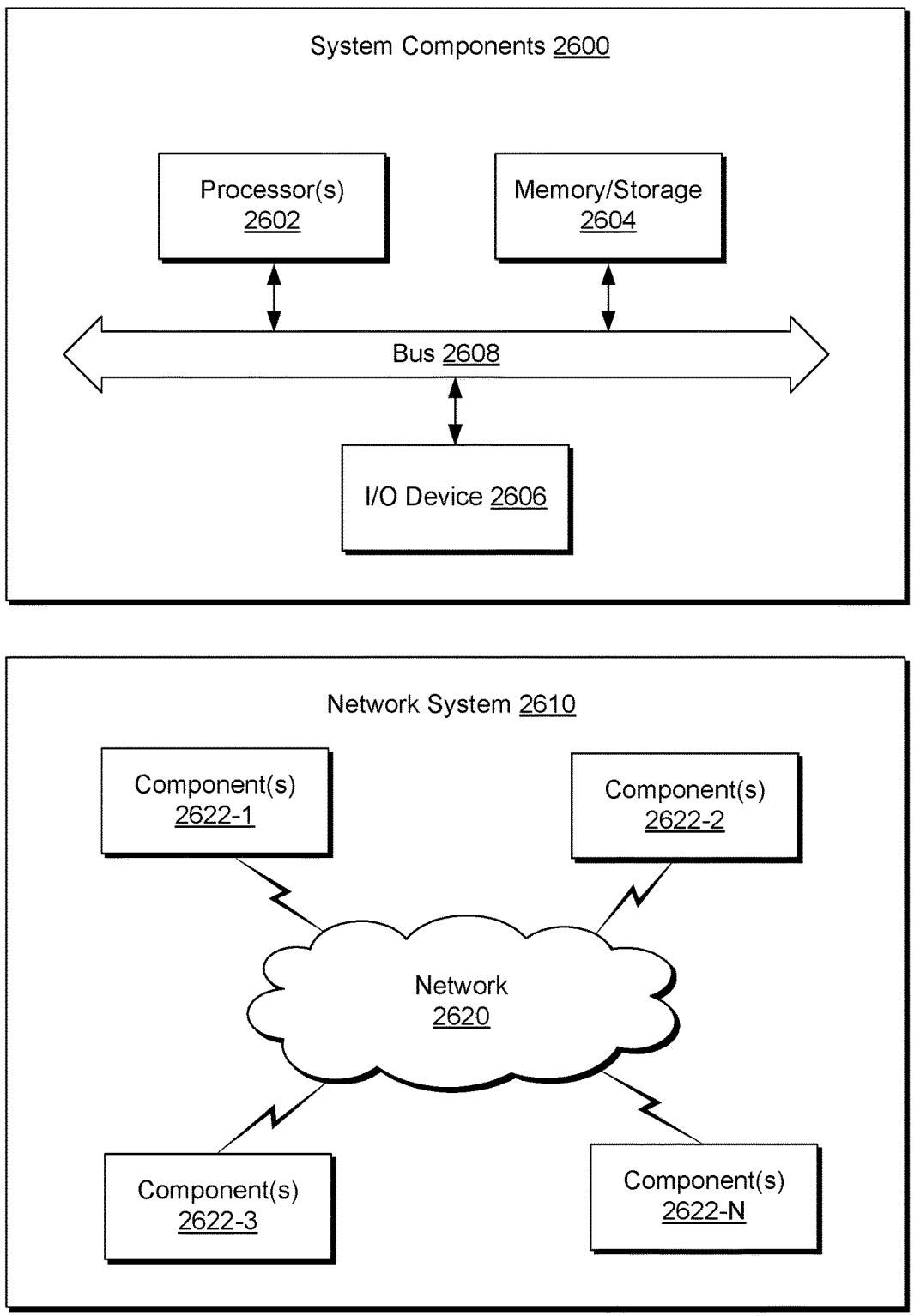
FIG. 26 illustrates example components of a system and a networked system.

FIG. 26 shows components of a computing system 2600 and a networked system 2610. The system 2600 includes one or more processors 2602, memory and/or storage components 2604, one or more input and/or output devices 2606 and a bus 2608. According to an embodiment, instructions may be stored in one or more computer-readable media (e.g., memory/storage components 2604). Such instructions may be read by one or more processors (e.g., the processor(s) 2602) via a communication bus (e.g., the bus 2608), which may be wired or wireless. The one or more processors may execute such instructions to implement (wholly or in part) one or more attributes (e.g., as part of a method). A user may view output from and interact with a process via an I/O device (e.g., the device 2606). According to an embodiment, a computer-readable medium may be a storage component such as a physical memory storage device, for example, a chip, a chip on a package, a memory card, etc.

According to an embodiment, components may be distributed, such as in the network system 2610. The network system 2610 includes components 2622-1, 2622-2, 2622-3, . . . 2622-N. For example, the components 2622-1 may include the processor(s) 2602 while the component(s) 2622-3 may include memory accessible by the processor(s) 2602. Further, the component(s) 2622-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   sensing, via one or more sensors coupled to a downhole tool disposed in a well, one or more parameters associated with at least one of: the downhole tool or the well;
   receiving data from the one or more sensors;
   providing the data to a digital decision model stored in memory of a system;
   receiving, from the digital decision model, a decision indicative of a selected decision state of a plurality of available decision states, wherein the decision is determined by the digital decision model based on the data;
   controlling one or more operations of the downhole tool based on the decision;
   determining that operation of the digital decision model would be improved by adding an additional decision state to the plurality of available decision states;
   transmitting, to a digital decision model generator, a request to update the digital decision model to add the additional decision state to the plurality of available decision states;
   responsive to the request, receiving, from the digital decision model generator, an updated digital decision model, wherein the updated digital decision model comprises the plurality of available decision states and the additional decision state;

storing the updated digital decision model in the memory of the system;

receiving, from the updated digital decision model, another decision; and controlling the one or more operations of the downhole tool based on the decision from the updated digital decision model.

2. The method of claim 1, wherein the digital decision model comprises a regression tree model.

3. The method of claim 1, wherein the system is moving in an environment, wherein the data received from the one or more sensors comprises one or more measurements of samples in the environment while the system is moving, wherein the digital decision model depends on a signal to noise ratio of the sensing, and wherein the signal to noise ratio changes responsive to physical changes in the environment that occur responsive to the system moving in the environment.

4. The method of claim 1, further comprising:

selecting, based on the selected decision state, a flag from a plurality of different flags stored in the memory, wherein the request to update the digital decision model corresponds to the selected flag, wherein the selected decision state comprises a terminal state of the digital decision model, and wherein the additional decision state of the updated digital decision model extends from the terminal state, and wherein at least one of the plurality of different flags stored in the memory is selectable for a non-terminal state of the digital decision model.

5. The method of claim 1, wherein the selected decision state depends on a measurement value of the data received from the one or more sensors.

6. The method of claim 1, wherein the transmitting comprises transmitting the request to a surface system, and wherein the receiving comprises receiving the updated digital decision model from the surface system utilizing a downhole telemetry technique.

7. The method of claim 1, wherein the system comprises a downhole system for deployment in a borehole in a geologic environment, and wherein the sensing comprises a nuclear magnetic resonance measurement operation that measures nuclear magnetic resonance signals of an in situ sample in the geologic environment.

8. The method of claim 1, further comprising restricting the updated digital decision model to a size that depends on the memory of the system, and wherein the restricting comprises adjusting the size of the updated digital decision model based on a signal to noise ratio of signals in the data received from the one or more sensors.

9. The method of claim 1, wherein the system comprises the downhole tool and surface equipment, and wherein the surface equipment is configured to, responsive to the request transmitted by the downhole tool being received by the surface equipment:

generate the updated digital decision model; and transmit the updated digital decision model from the surface equipment to the downhole tool.

10. The method of claim 1, wherein the selected decision state of the digital decision model requests a zoom-in process that adds at least one terminal structure to the digital decision model.

11. The method of claim 1, wherein the selected decision state of the digital decision model requests a zoom-out process that adds at least one branch to a layer of the digital decision model.

12. A system comprising:

a processor;

memory accessible to the processor;

processor-executable instructions stored in the memory and executable by the processor to instruct the system to:

sense, via one or more sensors coupled to a downhole tool disposed in a well, one or more parameters associated with at least one of: the downhole tool or the well;

receive data from the one or more sensors;

provide the data to a digital decision model stored in the memory of a system;

receive, from the digital decision model, a decision indicative of a selected decision state of a plurality of available decision states, wherein the decision is determined by the digital decision model based on the data;

control one or more operations of the downhole tool based on the decision;

determine that operation of the digital decision model would be improved by adding an additional decision state to the plurality of available decision states;

transmit, to a digital decision model generator, a request to update the digital decision model to add the additional decision state to the plurality of available decision states;

responsive to the request, receive, from the digital decision model generator, an updated digital decision model, wherein the updated digital decision model comprises the plurality of available decision states and the additional decision state;

store the updated digital decision model in the memory of the system;

receive, from the updated digital decision model, another decision; and control the one or more operations of the downhole tool based on the decision from the updated digital decision model.

13. One or more non-transitory computer-readable storage media comprising processor-executable instructions executable to instruct a processor to:

sense, via one or more sensors coupled to a downhole tool disposed in a well, one or more parameters associated with at least one of: the downhole tool or the well;

receive data from the one or more sensors;

provide the data to a digital decision model stored in a memory of a system;

receive, from the digital decision model, a decision indicative of a selected decision state of a plurality of available decision states, wherein the decision is determined by the digital decision model based on the data;

control one or more operations of the downhole tool based on the decision;

determine that operation of the digital decision model would be improved by adding an additional decision state to the plurality of available decision states;

transmit, to a digital decision model generator, a request to update the digital decision model to add the additional decision state to the plurality of available decision states;

responsive to the request, receive, from the digital decision model generator, an updated digital decision model, wherein the updated digital decision model comprises the plurality of available decision states and the additional decision state;

store the updated digital decision model in the memory of the system;

receive, from the updated digital decision model, another decision; and control the one or more operations of the downhole tool based on the decision from the updated digital decision model.

14. The one or more non-transitory computer-readable storage media of claim 13, wherein the digital decision model comprises a regression tree model.

15. The one or more non-transitory computer-readable storage media of claim 13, wherein the system is moving in an environment, wherein the data received from the one or more sensors comprises one or more measurements of samples in the environment while the system is moving, wherein the digital decision model depends on a signal to noise ratio of the sensing, and wherein the signal to noise ratio changes responsive to physical changes in the environment that occur responsive to the system moving in the environment.

16. The one or more non-transitory computer-readable storage media of claim 13, wherein the processor-executable instructions are executable to instruct the processor to select, based on the selected decision state, a flag from a plurality of different flags stored in the memory, wherein the request to update the digital decision model corresponds to the selected flag, wherein the selected decision state comprises a terminal state of the digital decision model, wherein the additional decision state of the updated digital decision model extends from the terminal state, and wherein at least one of the plurality of different flags stored in the memory is selectable for a non-terminal state of the digital decision model.

17. The one or more non-transitory computer-readable storage media of claim 13, wherein the selected decision state depends on a measurement value of the data received from the one or more sensors.

18. The one or more non-transitory computer-readable storage media of claim 13, wherein the system comprises a downhole system for deployment in a borehole in a geologic environment, and wherein the sensing comprises a nuclear magnetic resonance measurement operation that measures nuclear magnetic resonance signals of an in situ sample in the geologic environment.

\* \* \* \* \*